United States Patent
Tanuma et al.

[11] Patent Number: 5,818,488
[45] Date of Patent: Oct. 6, 1998

[54] PRINTER HAVING CIRCUIT FOR PROVIDING IMPROVED PRINTING QUALITY

[75] Inventors: Jiro Tanuma; Katsuyuki Ito; Shinichi Katakura; Nobuo Wakasugi; Kazuhiko Nagaoka; Toshikazu Ito, all of Tokyo, Japan

[73] Assignee: Oki Electric Industry Co., Ltd., Tokyo, Japan

[21] Appl. No.: 456,119

[22] Filed: May 31, 1995

Related U.S. Application Data

[62] Division of Ser. No. 907,643, Jul. 2, 1992, Pat. No. 5,648,810.

[30] Foreign Application Priority Data

Jul. 5, 1991 [JP] Japan .................................. 3-165872
Oct. 1, 1991 [JP] Japan .................................. 3-253967

[51] Int. Cl.[6] .............................. B41J 2/385; B41J 2/47; B41J 2/435; H04N 1/23
[52] U.S. Cl. .......................... 347/130; 347/131; 347/237; 347/240; 358/300; 358/302
[58] Field of Search .................................. 347/237, 240, 347/131, 132, 233, 224, 225, 130; 358/298, 296, 300, 302

[56] References Cited

U.S. PATENT DOCUMENTS

| | | |
|---|---|---|
| 4,074,319 | 2/1978 | Goldschmidt et al. . |
| 4,368,491 | 1/1983 | Saito . |
| 4,602,262 | 7/1986 | Milligan et al. . |
| 4,750,010 | 6/1988 | Ayers et al. . |
| 4,814,886 | 3/1989 | Kuge et al. ........................ 358/298 X |
| 4,814,891 | 3/1989 | Uchiyama et al. . |
| 4,835,549 | 5/1989 | Samejima et al. . |
| 4,835,551 | 5/1989 | Ng ............................................ 347/240 |
| 4,879,605 | 11/1989 | Warkentin et al. ...................... 358/296 |
| 5,105,202 | 4/1992 | Hewes ..................................... 349/240 |
| 5,134,495 | 7/1992 | Frazier et al. .......................... 358/298 |
| 5,138,310 | 8/1992 | Hirane et al. ....................... 347/237 X |
| 5,138,339 | 8/1992 | Curry et al. ............................ 347/240 |
| 5,182,575 | 1/1993 | Kato et al. . |
| 5,193,008 | 3/1993 | Frazier et al. .......................... 358/298 |
| 5,245,355 | 9/1993 | Morton ............................... 347/130 X |

FOREIGN PATENT DOCUMENTS

| | | |
|---|---|---|
| 0 283 934 | 9/1988 | European Pat. Off. . |
| 0 367 550 | 5/1990 | European Pat. Off. . |
| 4-146160 | 5/1992 | Japan ................................ B41J 2/44 |

OTHER PUBLICATIONS

J. P. Mantey and L. E. Rittenhouse, 'Cascadeable Linear LED Array Module', "IBM Technical Disclosure Bulletin", vol. 24, No. 10, pp. 5034–5037. Mar. 1982.

Primary Examiner—David F. Yockey
Attorney, Agent, or Firm—Spencer & Frank

[57] ABSTRACT

Bit data of a received video signal is partially converted into a first signal representing a data sequence corresponding to the resolution of an LED head. The remaining bit data of the received video signal, which are not converted into the first signal are converted into a second signal representing another data sequence corresponding to the resolution of an LED head. The LED head includes a resolution conversion circuit which converts the video data into the first signal and the second signal. The signals are stored in a shift register having a plurality of line buffers. The first signal is printed on a basic raster line and the second signal is printed on an additional raster line. An LED head drive energy with which basic raster lines are printed and another LED head drive energy with which additional raster lines are printed are set independently of each other.

6 Claims, 27 Drawing Sheets

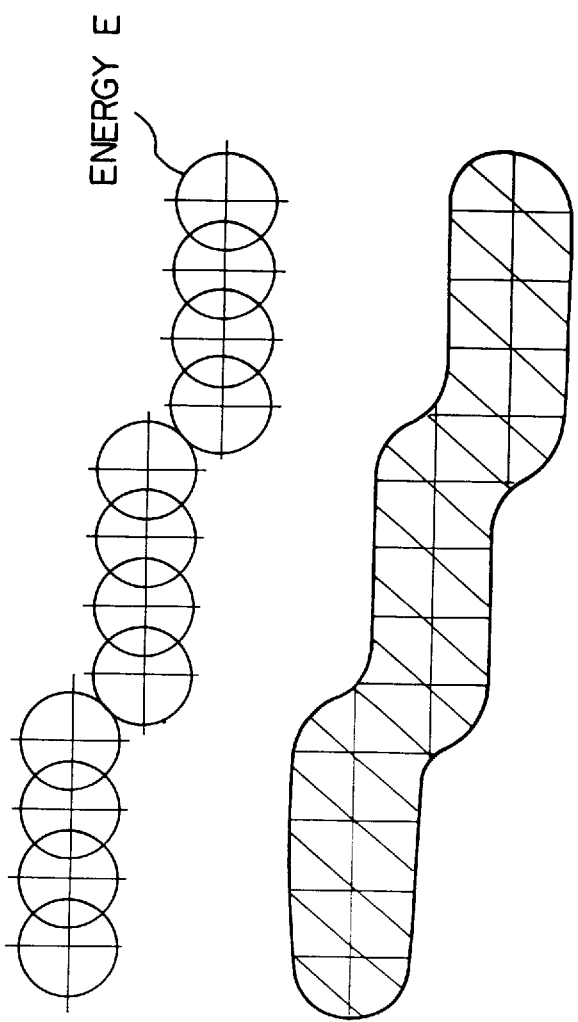
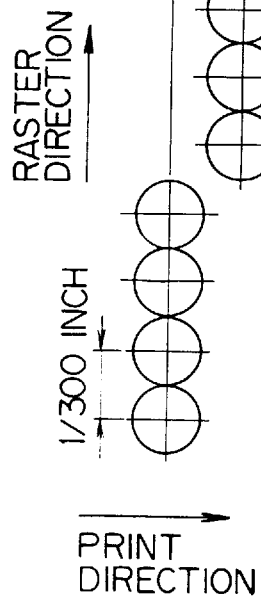
Fig. 5A PRIOR ART
300 DPI DATA
Fig. 5B PRIOR ART
PRINT TIMING & LED HEAD DRIVE ENERGY
Fig. 5C PRIOR ART
REAL PRINTING IMAGE

300 DPI
DATA

PRINT TIMING &
LED HEAD DRIVE
ENERGY

REAL PRINTING
IMAGE

PRIOR ART

600 DPI DATA

PRINT TIMING & LED HEAD DRIVE ENERGY

REAL PRINTING IMAGE

600 DPI DATA

PRINT TIMING & LED HEAD DRIVE ENERGY

REAL PRINTING IMAGE

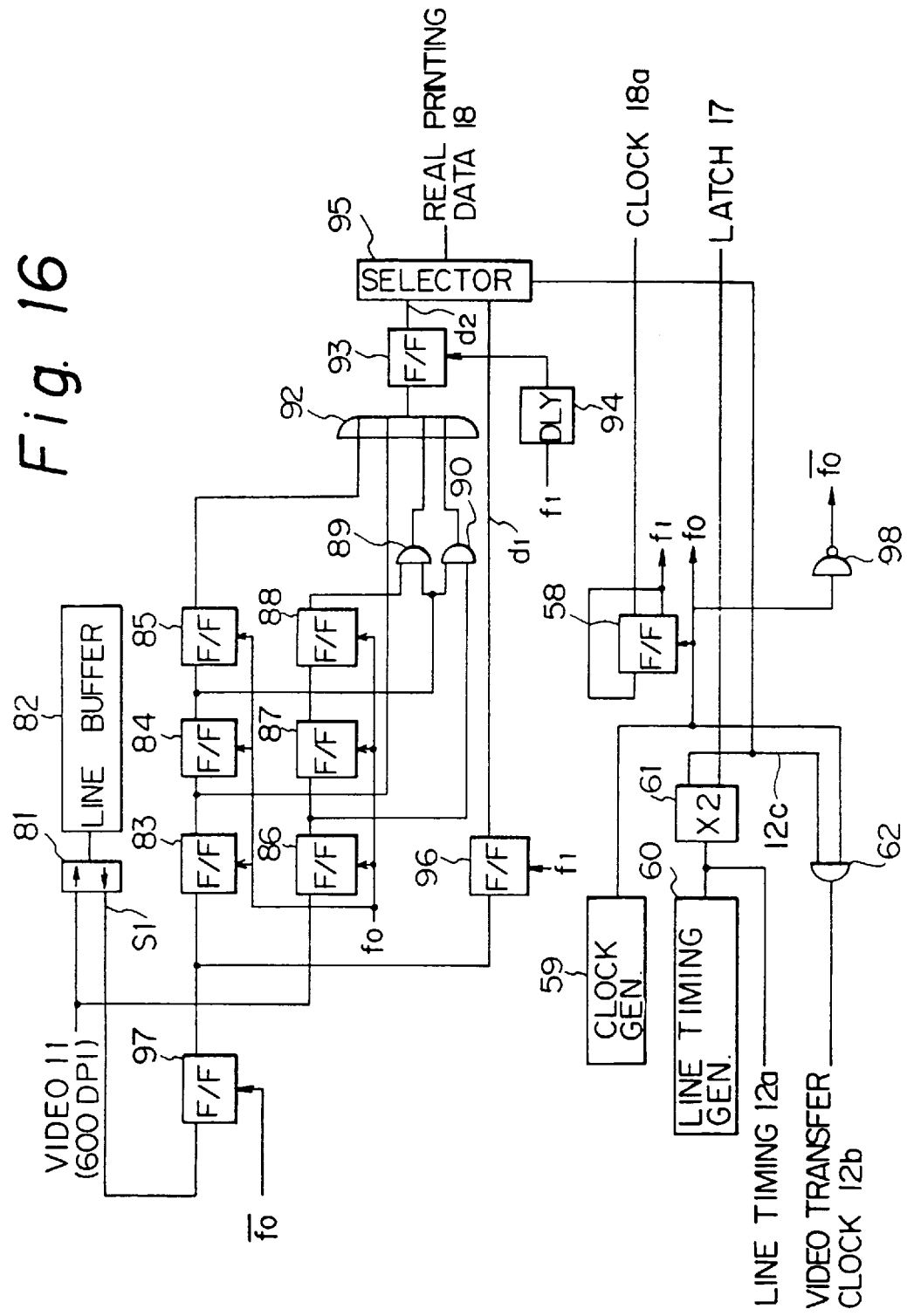

AREA NECESSARY FOR LOGICAL
OPERATION OF $B_{N,2j}$

PRINTER HAVING CIRCUIT FOR PROVIDING IMPROVED PRINTING QUALITY

This is a Division of application Ser. No. 07/907,643 filed Jul. 2, 1992, U.S. Pat. No. 5,648,810.

BACKGROUND OF THE INVENTION

1. Field of the Invention

The present invention relates to a non-impact printer, and more particularly to a printer improved in a printing quality to provide natural printing for a curve, a slash or the like.

2. Description of the Prior Art

Hitherto, in a non-impact printer such as an electrophotographic printer, electrically charged photoconductor drum is illuminated with a light source to form an electrostatic latent image on a surface thereof, a developing is performed upon adhesion of a toner to the electrostatic latent image, to form a toner image, and then the thus obtained toner image is transferred to a recording material to be fixed thereon.

FIG. 2 is a block diagram of a printer control circuit in a conventional non-impact printer. In FIG. 2, a printing control-unit 1 transmits, at the time point that a sheet arrives at a printing ready point, a timing signal 12, including a line and a raster timing signal, to a host or another controller, and receives a video signal 11 which has been edited on each page in the other controller. The video signal 11 received by the printing control unit 1 is transmitted to an LED (Light Emitting Diode) head 19 in the form of a real printing data signal 18.

FIG. 4 is a block diagram of the LED head in the conventional non-impact printer. In FIG. 4, the LED head 19 comprises a shift register 19a for storing in order a line of real printing data signal 18 from the printing control unit 1 shown in FIG. 2 in synchronism with a clock signal 18a, a latch 19b for temporarily holding a line of real printing data signal 18 stored in the shift register 19a in accordance with a latch signal 17, an LED group 19c wherein LED elements, the number of which corresponds to that of a line of dots, are arranged, and a driver group 19d for supplying the real printing data signal 18 held in the latch 19b to the LED group 19c.

The shift register 19a in the LED head 19 stores in order the real printing data signal 18 in synchronism with the clock signal 18a. Upon receipt of a line of video signal 11, the printing control unit 1 transmits a latch signal 17 to the LED head 19. The latch 19b holds a line of real printing data signal 18 stored in the shift register 19a in accordance with the latch signal 17. Before receiving the subsequent video signal 11 by the printing control unit 1, the thus held real printing data signal 18 is transmitted to the LED group 19c in accordance with a printing drive signal 13, so that the corresponding LED elements are lightened.

Transmission and receipt operation of the video signal 11 is performed in the unit of print lines. FIG. 3 is an operational time chart of the conventional non-impact printer mentioned above. However, according to the conventional non-impact printer mentioned above, the same size of dots are printed on a sheet depending on resolution of the LED head 19 which is determined by the arrangement of the LED elements at regular intervals in a raster direction. Thus, there will be retained a serrated edge-like image on a slash portion of the printed image due to the resolution.

FIGS. 5A, 5B and 5C, and FIGS. 6A, 6B and 6C are views showing printing states according to the conventional non-impact printer. FIGS. 5A and 6A show 300 dots per inch (DPI) data; FIGS. 5B and 6B each show a relation of print timing and driving energy for LED head; and FIGS. 5C and 6C each show a real printing image.

As shown in the figures, both of the real printing images have the undesirable serrated edge-like images, since the printing is performed on the predetermined raster lines. In view of the foregoing, if one contemplates increasing the density of the dots in order to improve a printing quality, then it is necessary to use the LED head 19 in which the LED elements are arranged at closer intervals or pitches. However, such an LED head 19 encounters the lower yield in manufacture of the parts where the LED elements are arranged, and thus it becomes very expensive.

SUMMARY OF THE INVENTION

It is therefore an object of the present invention, in view of the foregoing problems, to provide an improved printer.

It is another object of the present invention to provide a non-impact printer capable of receiving a video signal from another controller or a host controller, even if the video signal has a resolution higher than the print resolution of the printing unit, which will be defined by the arrangement pitch of the LED elements in a raster direction in the LED head.

It is still another object of the present invention to provide a non-impact printer capable of reducing a serrated edge-like image on a slash portion of the printed image by means of providing in appearance a higher dot density than the arrangement pitch or interval of the LED elements, thereby improving the printing quality.

It is still another object of the present invention to provide a non-impact printer which is inexpensive to manufacture.

In accordance with a preferred embodiment of the present invention, there is disclosed a non-impact printer provided with an LED head for printing and control means for providing a sequence control for the printer in its entirety in response to a control signal and a video signal from another controller, said control means including a print data receiving circuit adapted to receive the video signal from the other controller and transmit a timing signal to the other controller, said print data receiving circuit comprising: means for generating line timing signals defining printing on basic raster lines; means for generating additional line timing signals each defining printing on an additional raster line during an interval of a receiving timing of the line timing signals; first conversion means for converting partially bit data of the received video signal into a first signal representative of a data sequence corresponding to a resolution of the LED head; means for transmitting the first signal to the LED head in the form of a real printing data signal to be printed on the basic raster line in synchronism with the line timing signal; second conversion means for converting the remaining bit data of the received video signal, which are not converted into the first signal, into a second signal representative of another data sequence; a line buffer for storing the second signal transmitted from said second conversion means; and means for transmitting the second signal stored in said line buffer to the LED head in the form of a real printing data signal to be printed on the additional raster line in synchronism with the additional line timing signal, wherein said control means further includes means for setting a first LED head drive energy with which the basic raster lines are printed and a second LED head drive energy with which the additional raster lines are printed independently of each other.

In accordance with another preferred embodiment of the present invention, there is disclosed a non-impact printer provided with an LED head for printing and control means for providing a sequence control for the printer in its entirety in response to a control signal and a video signal from another controller, said control means including a print data receiving circuit adapted to receive the video signal from the other controller and transmit a timing signal to the other controller, said print data receiving circuit comprising: means for generating line timing signals defining printing on basic raster lines; means for generating additional line timing signals each defining printing on an additional raster line during an interval of a receiving timing of the line timing signals; a line buffer for storing the received video signal; first conversion means for reading out the video signal stored in said line buffer, converting bit data of the read out video signal into a first signal representative of a data sequence corresponding to a resolution in of the LED head, so that a resolution a raster direction is converted into that in a sheet transfer direction; means for transmitting the first signal to the LED head in the form of a real printing data signal to be printed on the basic raster line in synchronism with the line timing signal; second conversion means for performing a logical operation based on the current video signal entered and the previous video signal on the preceding line stored in the line buffer to generate a second signal representative of another data sequence, so that the resolution in the raster direction is converted into that in the sheet transfer direction; means for transmitting the second signal generated from said second conversion means to the LED head in the form of a real printing data signal to be printed on the additional raster line in synchronism with the additional line timing signal, wherein said control means further includes means for setting a first LED head drive energy with which the basic raster lines are printed and a second LED head drive energy with which the additional raster lines are printed independently of each other.

In accordance with a further preferred embodiment of the present invention, there is disclosed a non-impact printer provided with an LED head for printing and control means for providing a sequence control for the printer in its entirety in response to a control signal and a video signal from another controller, said control means including a print data receiving circuit adapted to receive the video signal from the other controller and transmit a timing signal to the other controller, said print data receiving circuit comprising: means for generating line timing signals defining printing on basic raster lines, and additional line timing signals each defining printing on an additional raster line; and resolution conversion means adapted to receive repeatedly twice bit data on the same line of the video signal corresponding to the line timing signal and the additional line timing signal, respectively, said resolution conversion means providing such a control that bit data corresponding to a resolution of the LED head is extracted from either one of the bit data to be repeatedly received to generate a first signal representative of a data sequence, and then the first signal is transmitted to the LED head in the form of a real printing data signal to be printed on the basic raster line in synchronism with the line timing signal, and bit data not corresponding to the resolution of the LED head is extracted from another of the bit data to be repeatedly received to generate a second signal representative of another data sequence, and then the second signal is transmitted to the LED head in the form of a real printing data signal to be printed on the additional raster line in synchronism with the additional line timing signal, wherein said control means further includes means for setting a first LED head drive energy with which the basic raster lines are printed and a second LED head drive energy with which the additional raster lines are printed independently of each other.

In accordance with a still further preferred embodiment of the present invention, there is disclosed a non-impact printer provided with an LED head for printing and control means for providing a sequence control for the printer in its entirety in response to a control signal and a video signal from another controller, said LED head including: a shift register comprising a plurality of line buffers adapted for storing a data sequence corresponding to a resolution of the LED head, which is extracted from bit data of a printing data signal transmitted from the control unit; and resolution conversion means for converting the remaining bit data not corresponding to the resolution of the LED head into at least one other data sequence corresponding to the resolution of the LED head, and for providing such a control that the at least one other data sequence is also stored in said line buffers, and the data sequence and the at least one other data sequence are alternately read out from said line buffers, so as to print the data sequence corresponding to the resolution of the LED head on a basic raster line and print the at least one other data sequence on at least one additional raster line, wherein said control means includes means for setting a first LED head drive energy with which the basic raster lines are printed and a second LED head drive energy with which the additional raster lines are printed independently of each other.

In accordance with a still further preferred embodiment of the present invention, there is disclosed a non-impact printer provided with an LED head for printing and control means for providing a sequence control for the printer in its entirety in response to a control signal and a video signal from another controller, said LED head including: a buffer for storing a printing data signal on the preceding line transmitted from the control unit; a logical operation circuit for performing a logical operation of the printing data signal on the preceding line stored in said buffer and the printing data signal now transmitted to generate a real printing data signal for printing on additional raster lines; storage means for storing the real printing data signal from said logical operation circuit and another real printing data signal for printing on basic raster lines; and means for taking out alternately the real printing data signal and the other real printing data signal from said storage means, wherein said control means includes means for setting a first LED head drive energy with which the basic raster lines are printed and a second LED head drive energy with which the additional raster lines are printed independently of each other.

BRIEF DESCRIPTION OF THE DRAWINGS

The objects and features of the present invention will become more apparent from the a consideration of the following detailed description taken in conjunction with the accompanying drawings in which:

FIGS. 5A, 5B and 5C, and 6A, 6B and 6C are views useful for explanation of printing states according to the conventional non-impact printer;

FIG. 16 is a schematic block diagram showing a print data receiving circuit of a non-impact printer according to a second embodiment of the present invention;

DESCRIPTION OF THE PREFERRED EMBODIMENTS

Figure 1:
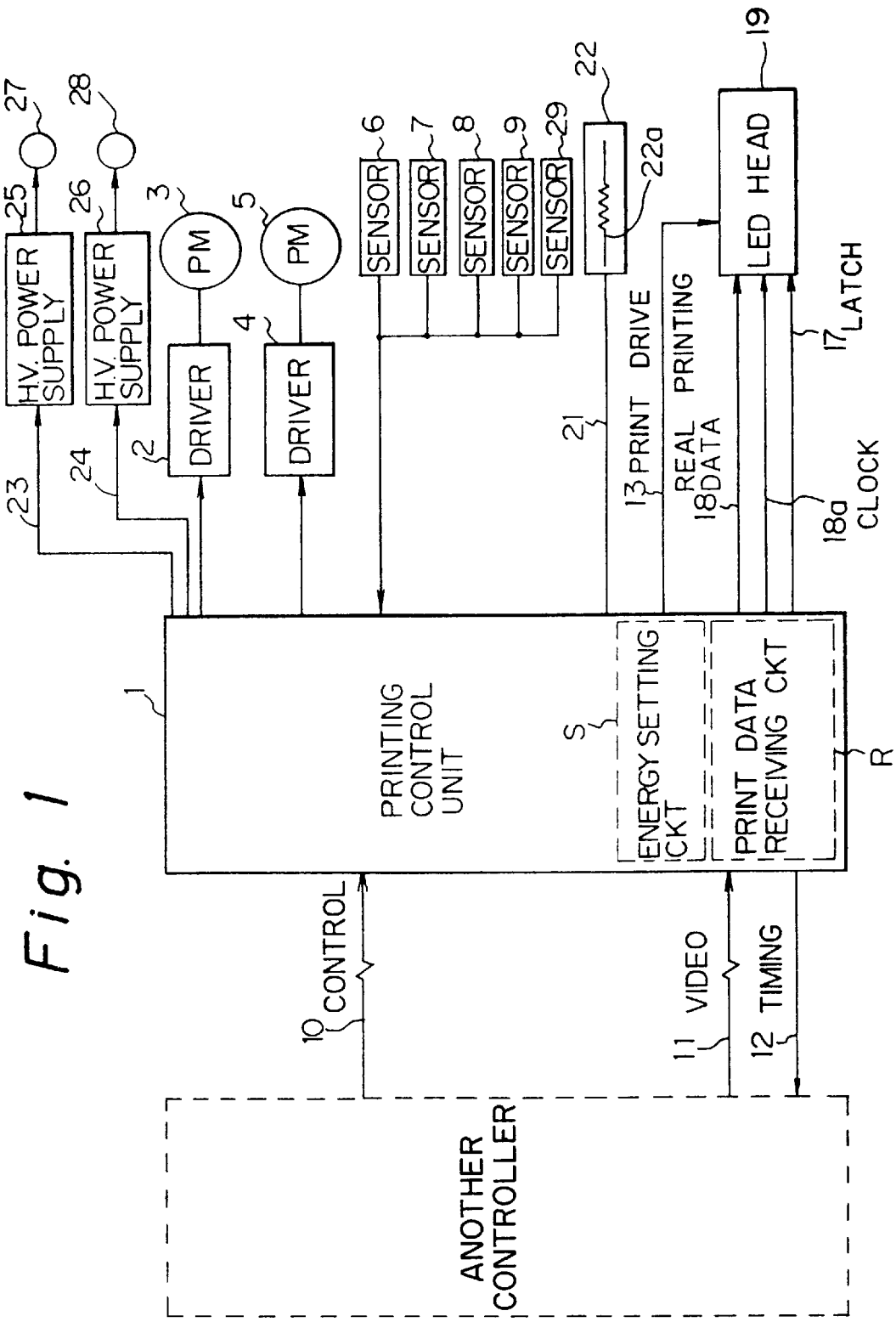
FIG. 1 is a schematic block diagram of a control circuit of a non-impact printer according to a preferred embodiment of the present invention.
Figure 2:
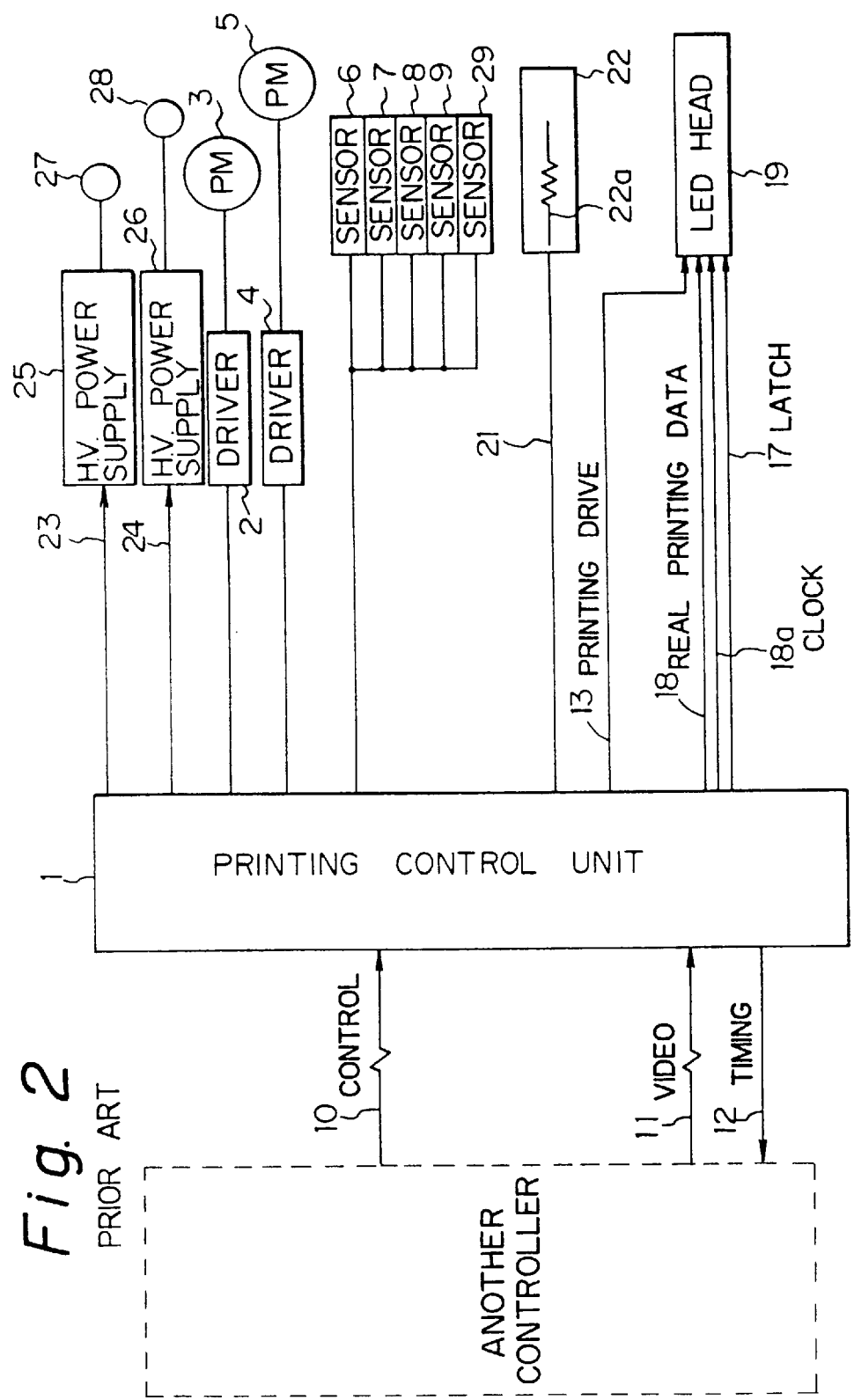
FIG. 2 is a schematic block diagram showing a printer unit control circuit of a conventional non-impact printer.
Figure 3:
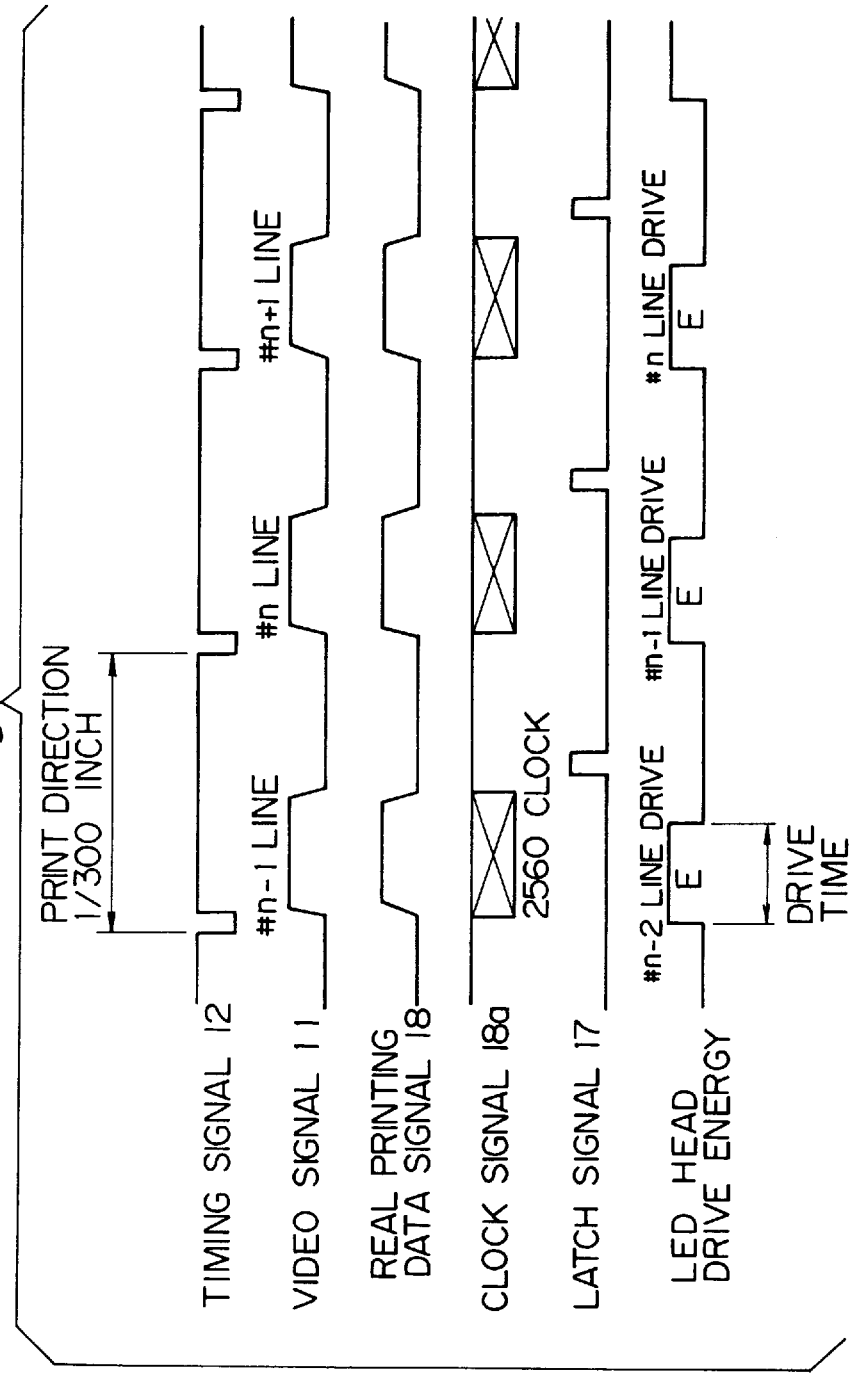
FIG. 3 is a time chart useful for explanation of the conventional non-impact printer.
Figure 7:
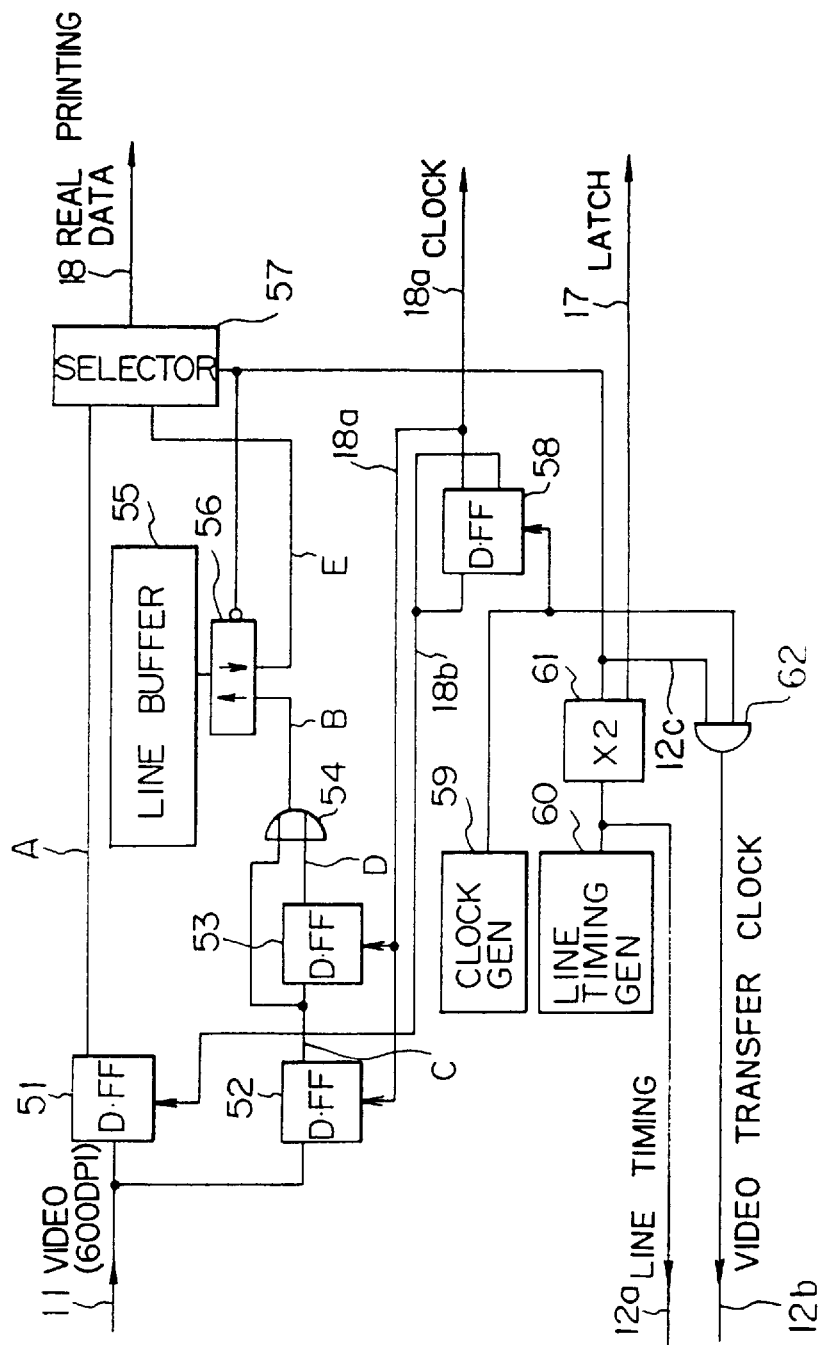
FIG. 7 is a schematic block diagram showing a print data receiving circuit of a non-impact printer according to a first embodiment of the present invention.
Figure 8:
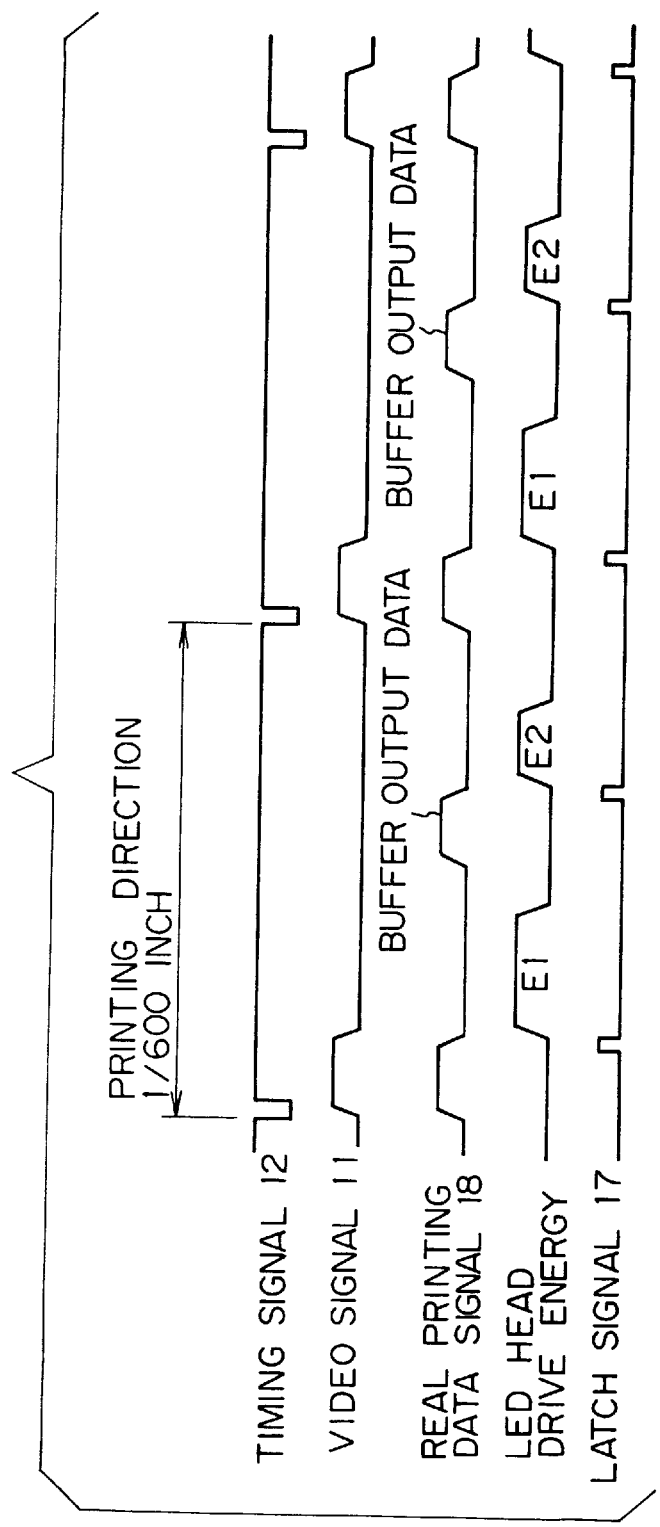
FIG. 8 is a time chart useful for understanding the print data receiving circuit.
Figure 9:
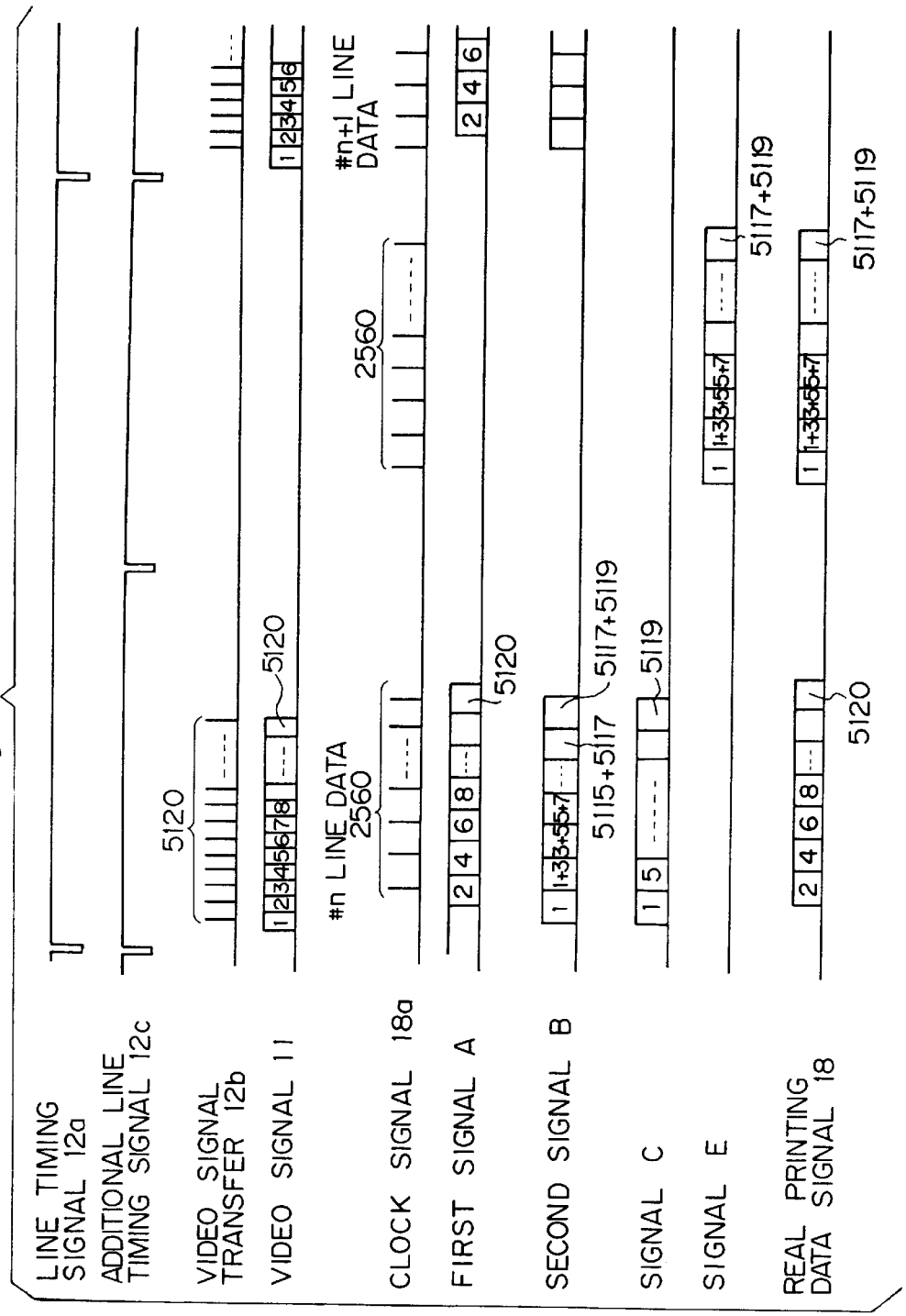
FIG. 9 is a detailed time chart useful for explanation of the print data receiving circuit.

The preferred embodiments of a printer in accordance with the invention will be described in detail with reference to the drawings. FIG. 1 shows a block diagram of a control circuit in a non-impact printer according to an embodiment of the present invention, and FIG. 7 shows a block diagram of a print data receiving circuit.

In FIG. 1, a printing control unit or main control 1 comprises a microprocessor, a ROM, a RAM, input/output ports, a timer and similar components, and is provided inside a printing unit of a printer. The printing control unit 1 provides sequence control for the printer in its entirety in response to control signals 10 and a video signal 11 from another controller, such as an interface control unit, a host controller, or the like. Upon receipt of a print instruction included in the control signals 10, the printing control unit 1 first causes a fuser temperature sensor 29 to sense whether or not a fuser 22 including a heater 22a is in an acceptable temperature range, and if not, turns on the heater 22a in timed with signal 21 to heat the fuser 22 up to an acceptable temperature. Next, a motor (PM) 3 for development/transfer process is driven through a driver 2, and simultaneously a high voltage power source 25 for charging is turned on in response to a charge trigger signal 23 to perform charging of a developing unit 27.

The sort of sheet set is determined on the basis of the results from a sheet remaining amount sensor 8 and a sheet size sensor 9 to start feeding sheets corresponding to the sort of sheet thus sensed. A motor (PM) 5 for sheet feed is able to rotate in a bilateral direction through a driver 4. The motor 5 first reversely rotates to carry the set sheet by a predetermined amount until a sheet inhalation inlet sensor 6 senses the sheet, and subsequently, regularly rotates to transfer the sheet to a printing device in the inside of the printer.

Now, the embodiment of a non-impact printer of the invention will be described further taking by way of example a case in which printing is performed with a resolution (the arrangement pitch in a raster direction of light emitting diode (LED) devices) of 300 dots per inch (DPI) by an LED head 19 in a printing unit of the non-impact printer, in which the video signal 11 that is received has a resolution of 600 DPI, and in which the resolution of the real printing image is 300 DPI in the raster direction and 1200 DPI (pseudo 600 DPI) in a printing direction (the sheet feed direction).

The printing control unit 1 transmits, at the time point that the sheet arrives at a printing ready point, a timing signal 12, including a line timing signal 12a and a raster timing signal, to another controller, and receives a video signal 11. The received video signal 11, which has been edited in units of pages in the other controller or the host controller and which has a resolution of 600 DPI (row and column), is supplied to a print data receiving circuit R included in the printing control unit 1. The print data receiving circuit R is adapted to receive the video signal 11 from the other controller and transmit the timing signal 12 to the other controller.

FIG. 7 shows a block diagram of a first embodiment of such a print data receiving circuit R. Referring to FIGS. 7, 8, 9, 10 and 11, the received video signal 11 is partially converted by a flip-flop 51 for resolution conversion into a first signal A consisting of a data sequence corresponding to the resolution of the LED head 19, and the resultant signal from the conversion is transmitted through a selector 57 to the LED head 19 in the form of a real printing data signal 18 (300 DPI) so as to be printed on basic raster lines 102. Simultaneously, the remaining data of the received video signal 11, which is not converted into the first signal A, is converted by flip-flops 52 and 53 and an OR gate 54 into a second signal B consisting of another data sequence. The resultant signal from the latter conversion is transmitted through a selector 56 to a line buffer 55 and then stored therein so as to be printed on additional raster lines 120 each located at a distance 1/1200 inch from the basic raster line 102 in a print direction, or at an intermediate point of a print position for each 600 DPI of the received video signal. A clock signal 18a to be supplied to the LED head 19 is divided in frequency by a flip-flop 58 to reduce it to one half for a video signal transfer clock signal 12b which is supplied from the print control unit to the host controller.

A frequency multiplier 61 serves to provide an output which is two times as high as the frequency of a line timing signal 12a generated from by a line timing signal generator 60, and generates an additional line timing signal 12c for printing on an additional raster line 120 during an interval of a receiving timing of the line timing signals 12a.

A clock signal generator 59 generates a clock signal which is supplied to the flip-flop 58. The clock signal 18a, which is delivered from an output terminal of the flip-flop 58, is supplied to the flip-flops 52 and 53 as well as the LED head 19. A clock signal 18b, which is delivered from a reversal output terminal of the flip-flop 58, is supplied to an input terminal thereof and in addition to the flip-flop 51.

Consequently, the flip-flops 51 and 52 are different from each other in the timing of the clock signals 18a and 18b, so that they produce different data sequences. In other words, the flip-flop 51 outputs the first signal A as mentioned above, and the flip-flop 52 outputs a signal C comprising data sequence which is obtained when the first signal A is removed from the data sequence of the video signal 11. The signal C is transmitted to the flip-flop 53, so that it outputs a signal D. The signals C and D are further transmitted to the logical OR gate 54, which outputs the second signal B.

Figure 10:
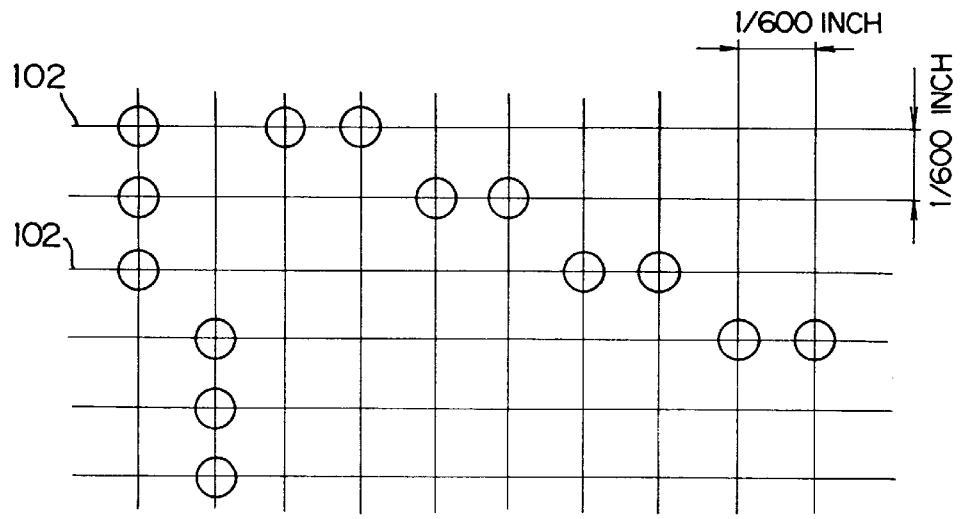
FIG. 10 shows bit data according to the received video signal.
Figure 11:
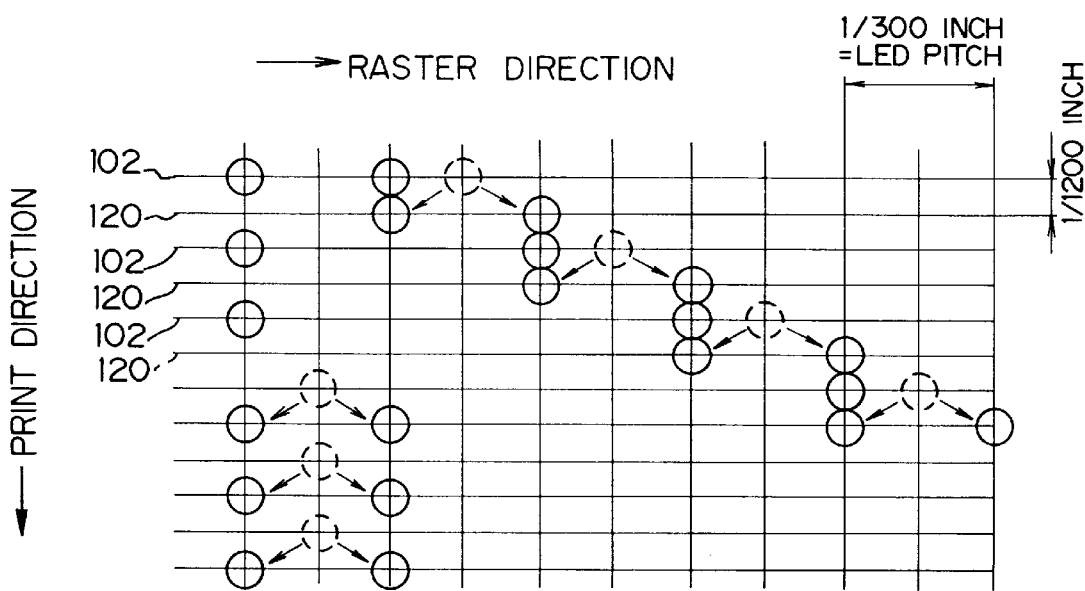
FIG. 11 shows bit data according to the real print data signal.

The video signal 11 received with the resolution of 600 DPI, as shown in FIG. 10, is divided into two groups, as shown in FIG. 11, one including data which are printed with 300 DPI resolution as they are, and another including pseudo 600 DPI data each divided into two dots as shown by arrows. Those groups are printed separately on a different timing basis. Each of the dots represented by circles shown with broken lines on the basic raster lines 102 in FIG. 11, which corresponds to the signal C outputted from the flip-flop 52, is represented by two dots on the additional laster lines 120 in FIG. 11, which correspond to the signal B output from the OR gate 54.

The printing control unit 1 transmits a line of real printing data signal 18 and then a latch signal 17 to the LED head 19, so that the thinned out real printing data signal 18 (300 DIP) is held in the LED head 19. The LED head 19 includes a number of LED devices which are arranged in a raster direction. Upon receipt of a printing drive signal 13, the LED head 19 is driven with an LED head drive energy E1 in accordance with the held real printing data signal 18, so that an electrostatic latent image is formed on a photoconductive drum, not shown.

Next, when the sheet advances by 1/1200 inch in a sheet feed direction, and the printing control unit 1 switches the selectors 56 and 57 to take out the data (pseudo 600 DPI) stored in the line buffer 55 as a signal E. The signal E is transferred to the LED head 19 in the form of the real printing data signal 18 in synchronism with the clock signal 18a. At that time, no line timing signal 12a is emitted to the host controller, and thus the above-mentioned operation is carried out only in the printing control unit 1.

Then, the printing control unit 1 transmits a latch signal 17 to the LED head 19, so that the real printing data signal 18 (pseudo 600 DIP) is held in the LED head 19. Upon receipt of a printing drive signal 13, the LED head 19 is driven with an LED head drive energy E2 in accordance with the held real printing data signal 18, so that an electrostatic latent image is formed on the photoconductive drum.

Figure 12A:
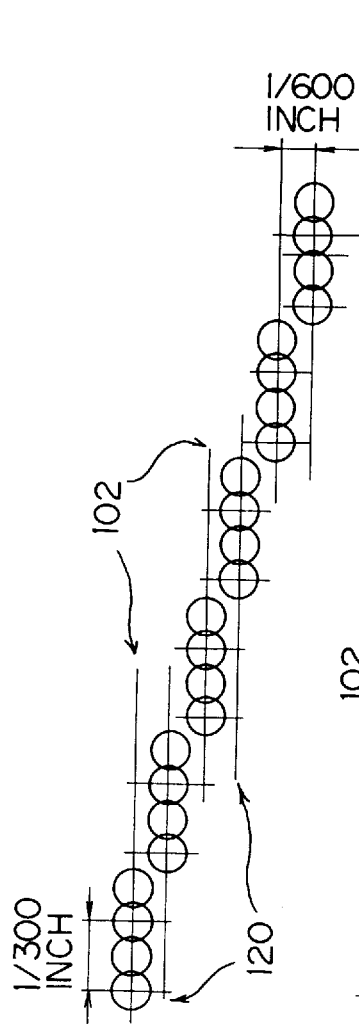
FIGS. 12A, 12B and 12C, and 13A, 13B and 13C are views useful for explanation of printing states according to the non-impact printer of the present invention.
Figure 12B:
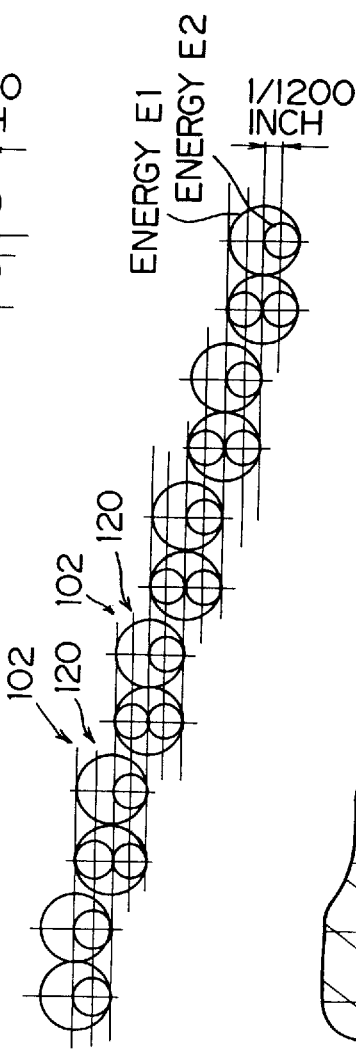
Figure 12C:
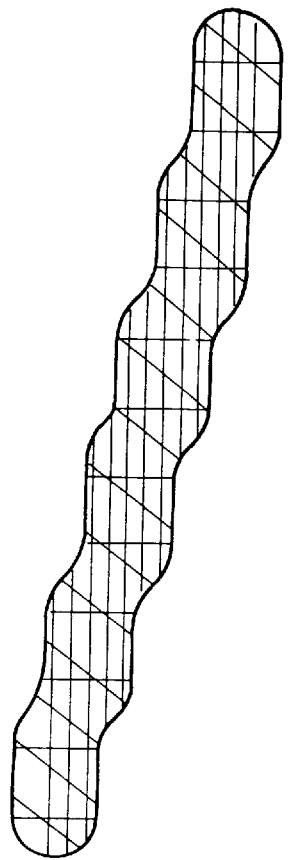
Figure 13A:
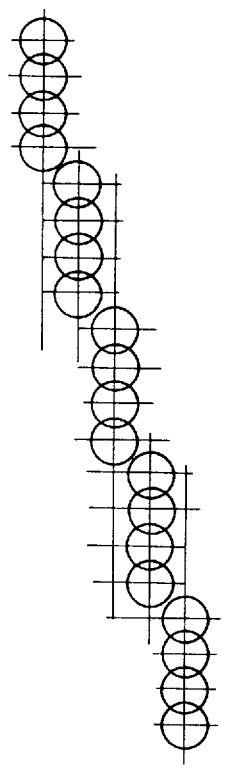
Figure 13B:
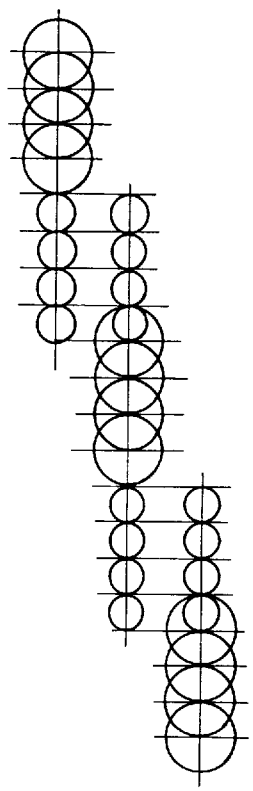
Figure 13C:
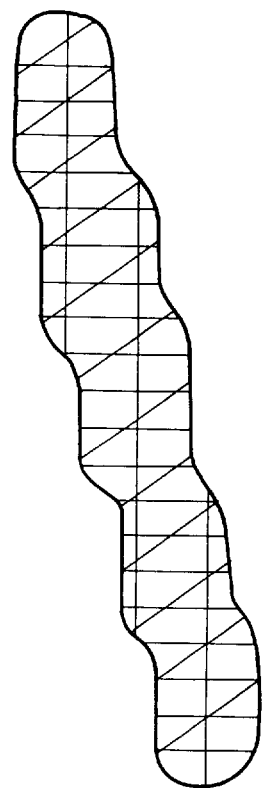

The LED head drive energies E1 and E2 are predetermined independently of each other, as shown in FIGS. 12 and 13, so as to obtain an equivalence of the dot images formed when printing with the pseudo 600 DIP resolution and the dot images formed when printing with the basic 300 DIP resolution.

According to the present embodiment, the conversion is performed in such a manner that data is increased at a place located at a distance of 1/1200 inch from a basic raster line. The LED head drive energies E1 and E2 are predetermined so as to satisfy the relation, E1>E2, and while they can be varied depending on the developing unit 27, lenses, the characteristics of the toner, etc., they are represented by $$E1=(0.4 \text{ to } 0.6) \times E$$

$$E2=(0.15 \text{ to } 0.25) \times E,$$

where E denotes the LED head drive energy at the standard 300 DPI resolution.

The printing control unit 1 includes a drive energy setting circuit S for predetermining the LED head drive energy E1 and E2 independently of each other. A block diagram of such a drive energy setting circuit is shown by way of example in FIG. 28.

Figure 28:
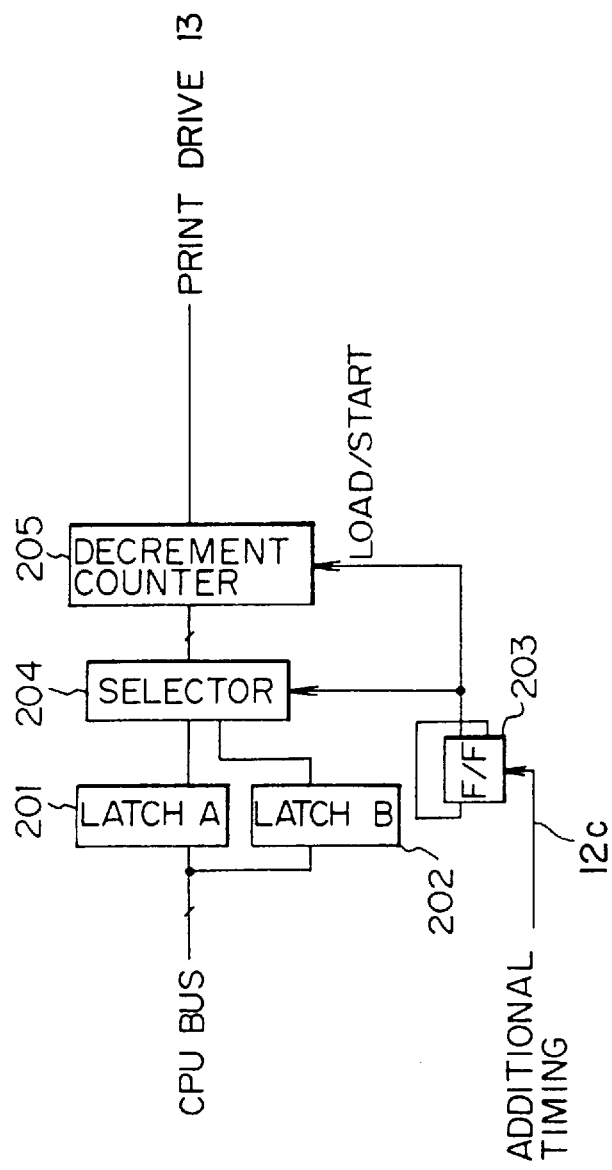
FIG. 28 is a block diagram showing exemplarily a drive energy setting circuit S in FIGS. 1 and 22.

In FIG. 28, prior to the printing operation, digital values, which correspond to the LED head drive energies E1 and E2, respectively, are transmitted from a CPU or the like in the printing control unit 1 through a CPU bus to a latch A 201 and a latch B 202, respectively, and then stored therein. At the time of printing, those latched data are alternately selected by a selector 204 in accordance with an output of a toggle flip-flop 203 which is operative in response to the additional line timing signal 12c, so as to load a decrement counter 205 in response to the additional line timing signal 12c. The decrement counter 205 generates a pulse output during a counting period of time. This pulse output may be used as the printing drive signal 13.

Figure 14:
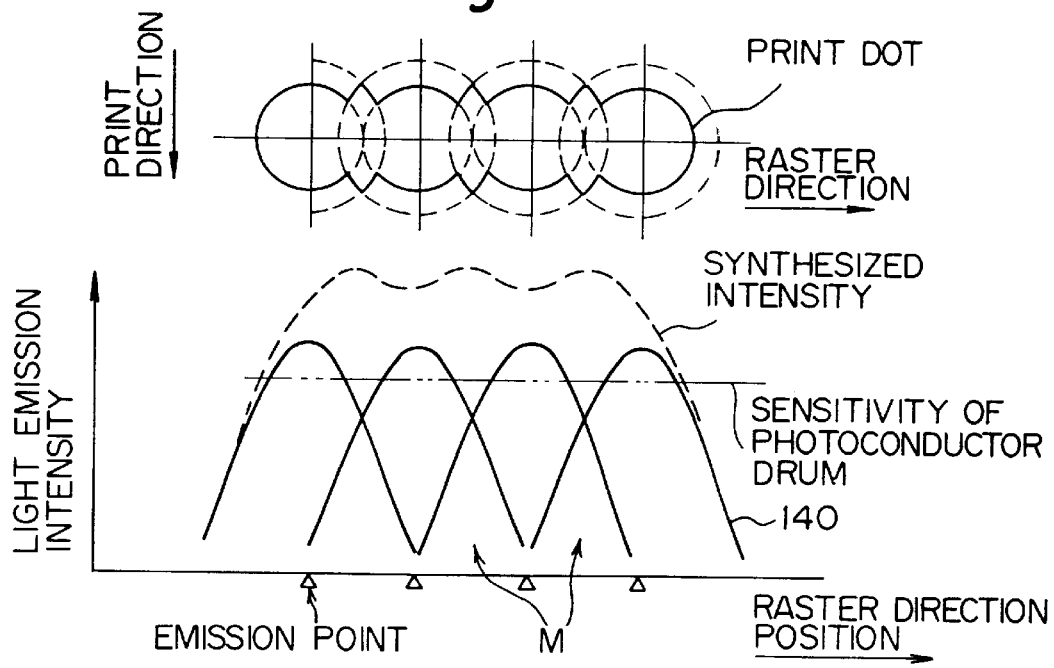
FIGS. 14 and 15 are views illustrating LED light emission energy intensity and printing dots on a raster line according to a first and a second scheme, respectively.

Referring FIGS. 14 and 15, there will be described some schemes for performing printing with a resolution exceeding that of the LED head 19. In FIG. 14, light emission intensity 140 at the light emission point of the respective LED devices of the LED head 19 sufficiently exceeds the sensitivity of the photoconductor drum, so that print dots are formed at the associated light emission point positions. At that time, the light emission intensity in intermediate portions M will be increased owing to overlapping of light emission at the adjacent light emission points to exceed the sensitivity of the photoconductor drum which is necessary to form an electrostatic latent image thereon, so that the printing is performed at the associated intermediate portions M. Thus, the adjacent dots are coupled by the exposure at the intermediate portions M. This scheme will be useful for printing on the basic raster lines.

Figure 15:
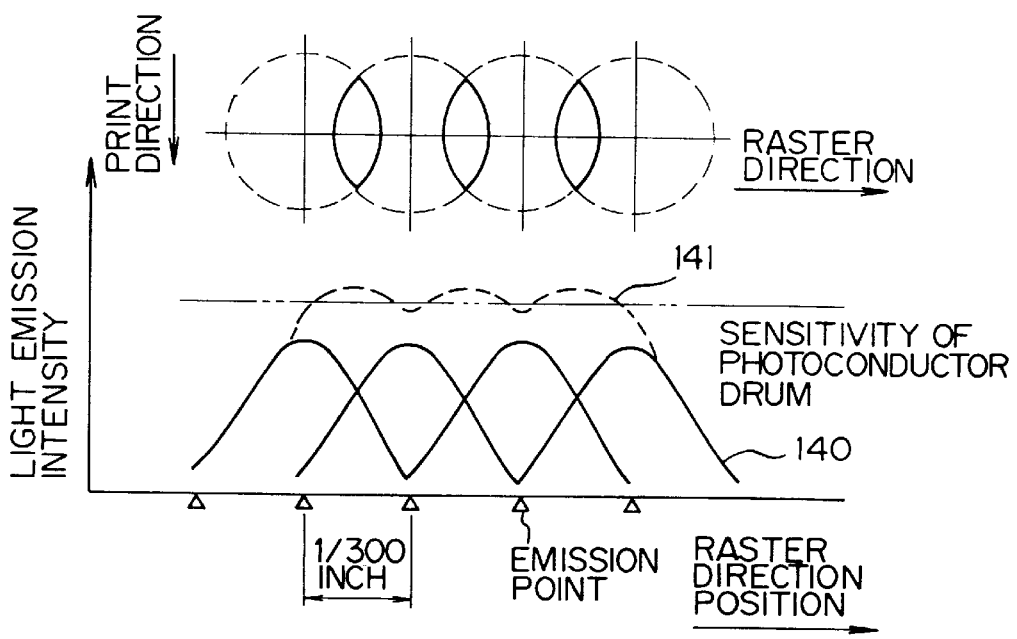

In FIG. 15, light emission intensity 140 at the light emission point of the respective LED devices of the LED head 19 is less than the sensitivity of the photoconductor drum which is necessary to form an electrostatic latent image thereon, so that no print dots are formed. On the other hand, if it happens that simultaneous light emission occurs at the adjacent light emission points, the synthesized light emission intensity 141 exceeds the sensitivity of the photoconductor drum at the intermediate portions M.

Consequently, it is possible to form dots at the intermediate portions M, that is, it is possible to perform printing with a resolution which is twice as high as that of the printer unit. This scheme will be useful for printing on the additional raster lines.

Figure 17A:
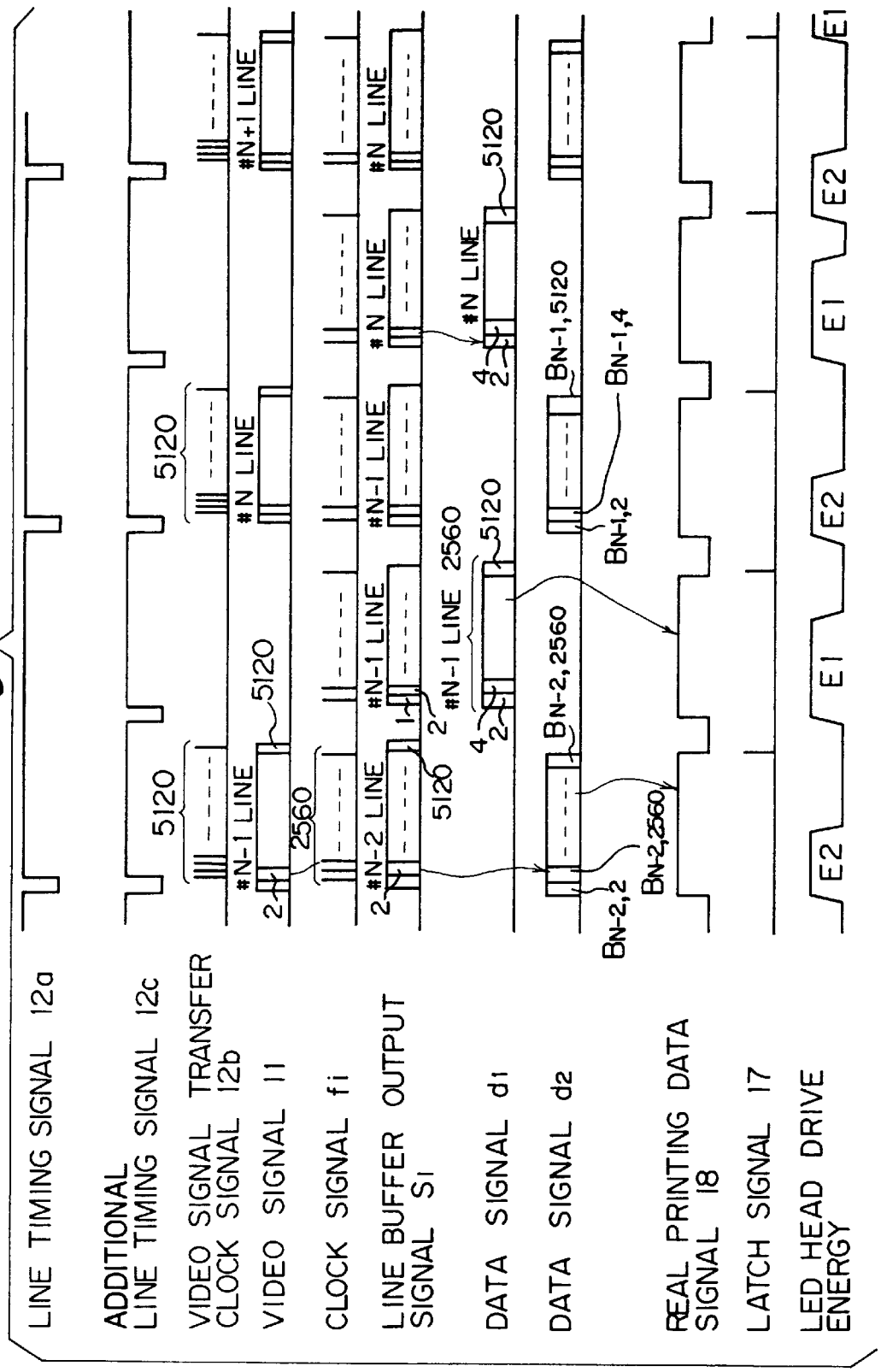
FIG. 17A is a time chart useful for understanding how the print data receiving circuit operates.
Figure 17B:
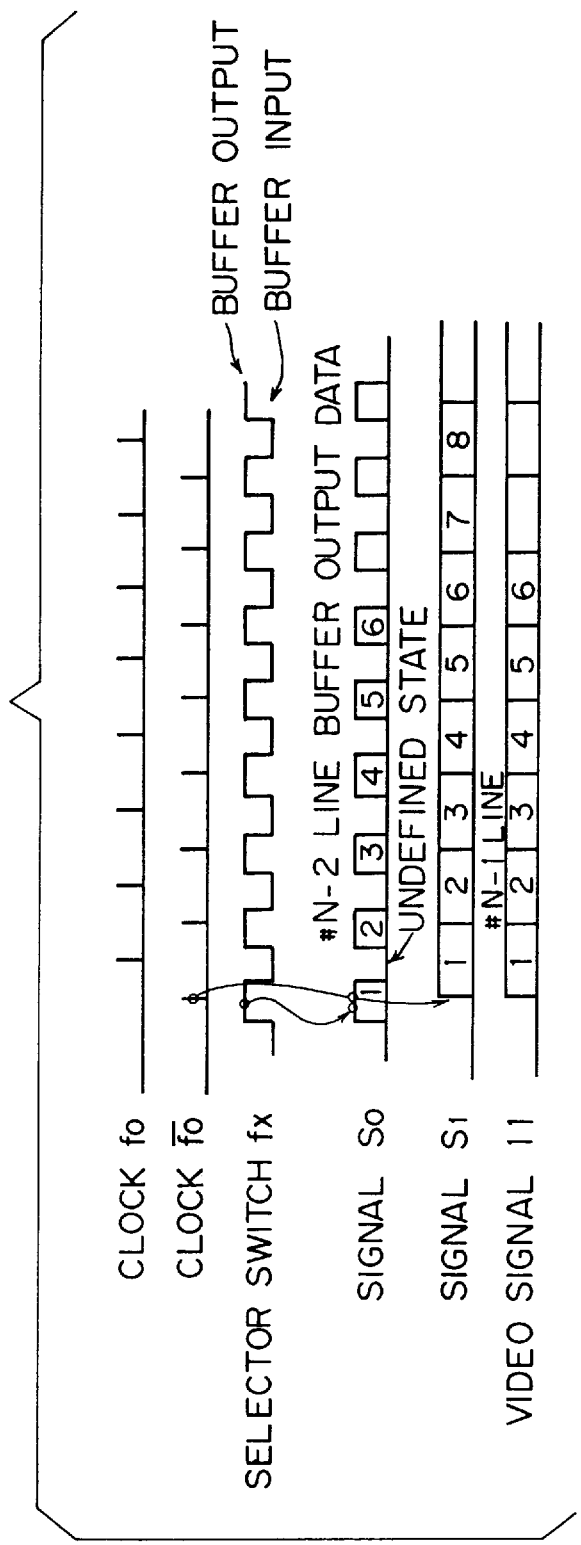
FIG. 17B is a detailed time chart useful for explanation of the print data receiving circuit.

FIG. 16 shows a block diagram of a print data receiving circuit R, as an alternative or second embodiment, shown in FIG. 1. This embodiment the real printing data for printing on the additional raster lines is obtained by means of a logical operation. Referring to FIGS. 16, and 17A and 17B, the print data receiving circuit R shown in FIG. 16 includes a flip-flop 58 for dividing in frequency a clock signal $f_0$ generated by a clock signal generator 59 to reduce it to one-half, a line timing signal generator 60, and a frequency multiplier 61 adapted to provide an output which is two times as high as the frequency of a line timing signal 12*a* generated by the line timing signal generator 60 and to generate an additional line timing signal 12*c* for printing on an additional raster line 120 during the respective timing intervals of the line timing signal 12*a*.

The clock signal $f_0$, which is generated by the clock signal generator 59, is supplied to the flip-flop 58, and in addition to the flip-flops 83 to 88. A clock signal 18*a*, which is delivered from an output terminal of the flip-flop 58, is supplied to the LED head 19 in FIG. 1. On the other hand, a clock signal $f_1$, which is delivered from a reversal output terminal of the flip-flop 58, is supplied to an input terminal thereof and in addition to a flip-flop 96 and a delay circuit 94.

The print data receiving circuit R shown in FIG. 16 further comprises a selector 81, a line buffer 82 connected to the selector 81 for storing 5120 bits of video signal 11, flip-flops 83, 84 and 85 for latching 3 bits of bit data in data signal S, taken out from the line buffer 82, flip-flops 86, 87 and 88 for latching three bits of bit data in the video signal 11, an AND gate 89 for taking a logical AND of the respective outputs of the flip-flops 84 and 88, a further AND gate 90 for taking a logical AND of the respective outputs of the flip-flops 84 and 86, an OR gate 92 for taking a logical OR of the respective outputs of the flip-flop 83, the flip-flop 85, the AND gate 89 and the AND gate 90:, a flip-flop 93 for taking out the output of the OR gate 92, a delay circuit 94 for providing a delay of an operational timing of the flip-flop 93 to an operational timing of the flip-flop 96, and a selector 95.

The video signal 11, which has been edited in units of pages in the other controller or the host controller and which has 600 DPI resolution, is supplied through the selector 81 to the line buffer 82 so as to be stored therein in the form of 5120 bits of bit data with the resolution of 600 DPI, when the selector 81 is operated to provide a direction of data transfer in which the line buffer 82 receives the video signal in accordance with an input/output selection signal $f_x$ for the selector 81 which is generated from the clock signal generator. In addition, the video signal 11 is latched in the flip-flops 86, 87 and 88 in the form of 3 adjacent bits of bit data. Likewise, the video signal 11 for the preceding line, which has been stored in the line buffer 82, is latched in the flip-flop 97 at a timing determined by a clock signal $f_0$ generated by a gate 98, when the selector 81 is operated to provide a direction of data transfer in which the line buffer 82 outputs the video signal in accordance with the input/output selection signal $f_x$. In addition, the video signal 11 is latched in the flip-flops 83, 84 and 85 in the form of 3 adjacent bits of bit data. A logical operation is performed on these data by the gates 89, 90 and 92 as represented by the following logical expression:

$$B_{N,2j} = (A_{N,2j-1}) + (A_{N,2j+1}) + (A_{N,2j}) \cdot (A_{N+1,2j+1}) + \qquad (1)$$
$$(A_{N,2j}) \cdot (A_{N+1,2j-1}),$$

where $A_{m,n}$ represents bit data on the m-th and n-th lines of the received 600 DPI video signal. If n is an even number, then it represents an LED head resolution position. If n is an odd number, then it does an intermediate position of LED head resolution positions. In addition, $B_{m,n}$ represents bit data on an additional raster data line.

Thus, the bit data, which is subjected to the logical operation based on the current video signal 11 that has been entered and the previous video signal 11 on the preceding line, is supplied to the flip-flop 93 so that the resolution in the raster direction is converted into that in the sheet transfer direction as the intermediate point data. The resultant bit data from the conversion is transmitted as the real printing data 18 through the selector to the LED head 19 in FIG. 1.

Figure 18A:
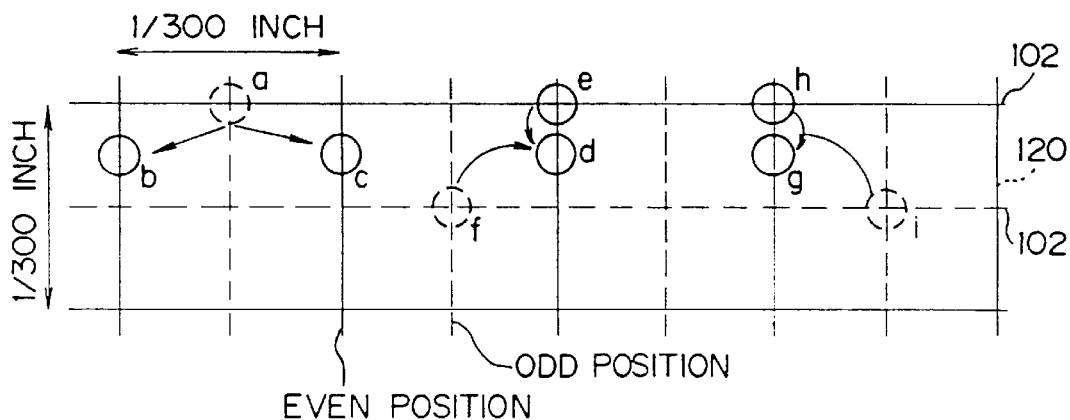
FIGS. 18A and 18B are views useful for explanation of a resolution conversion in the non-impact printer according to the second embodiment of the present invention.
Figure 18B:
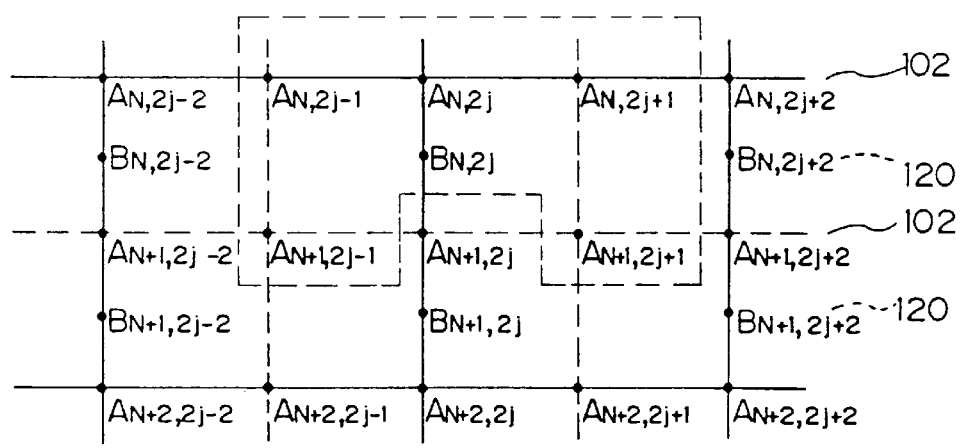

FIG. 18A shows the states of a resolution conversion of the bit data, and FIG. 18B shows the coordinates of the raster lines. When the logical operation is carried out in accordance with equation (1) as set forth above, the bit data that are represented by circles shown with dotted lines on the basic raster lines 102 in FIG. 18A are converted into the bit data represented by circles shown with solid lines on the additional raster lines 120.

More in detail, if it is considered that a dot "b" represented by a circle in FIG. 18A is applied to the equation (1) set forth above, data of a dot "a" exists at the second term of the right member of the equation (1), and thus the dot "b" is generated as printing data. Similarly, regarding a dot "c", data of the dot "a" exists at the first term of the right member of the equation (1), and thus the dot "c" is generated as printing data. Regarding a dot "d", data of dots "e" and "f" exist at the fourth term of the right member of the equation (1), and thus a dot "d" is generated as printing data. Regarding a dot "g", data of dots "h" and "i" exist at the third term of the right member of the equation (1), and thus a dot "g" is generated as printing data.

FIG. 18B shows the coordinate of the related raster lines before and after the noted coordinate $B_{N,2}$; on an additional raster line, on which it is determined whether or not a real printing data is to be produced.

Figure 19A:
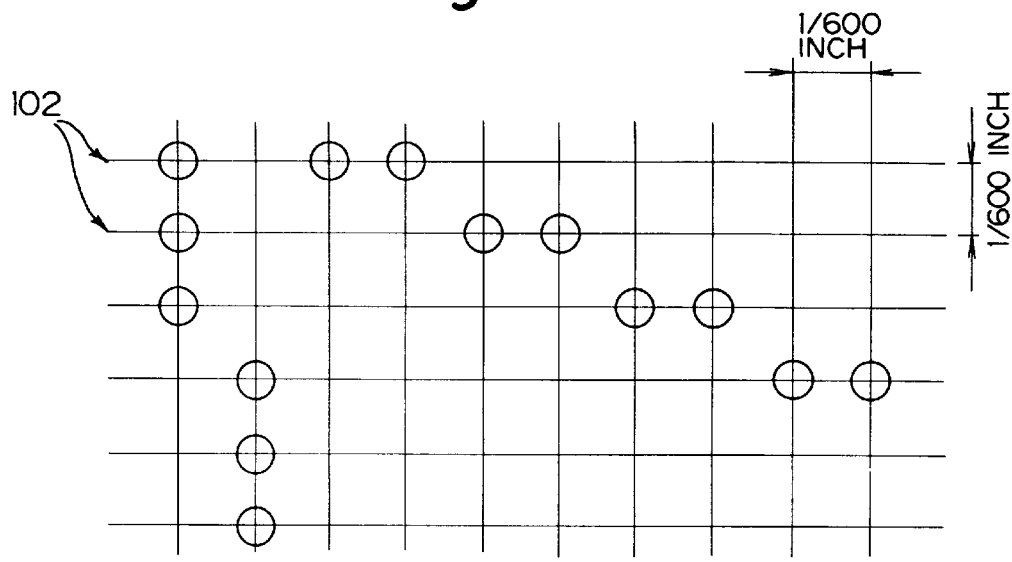
FIGS. 19A and 19B schematically show bit data before and after the resolution conversion, respectively, in the non-impact printer according to the second embodiment of the present invention.
Figure 19B:
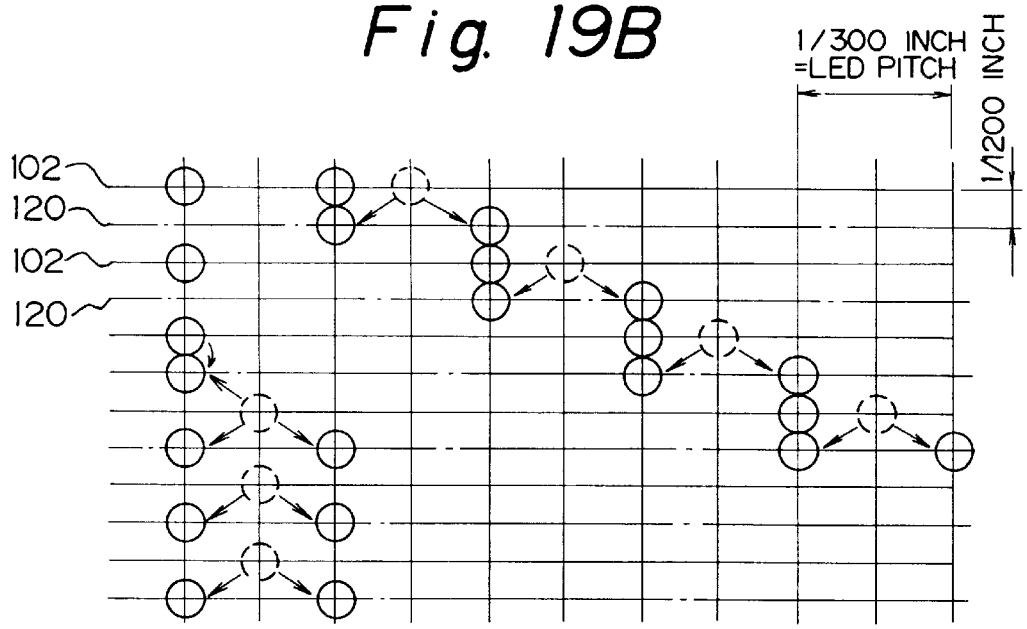

FIG. 19A schematically shows bit data before the resolution conversion, and FIG. 19B schematically shows the data after the resolution conversion. The video signal 11 received with a resolution of 600 DPI, as shown in FIG. 19A, is divided into two groups, as shown in FIG. 19B, one including bit data which are printed on the basic raster lines with 300 DPI resolution as they are, and another including bit data which are to be subjected to a logical operation according to equation (1) set forth above and to be printed on the additional raster lines.

The clock signal 18*a* that is supplied to the LED head 19 is generated by flip-flop 58, which divides the clock signal $f_0$ in frequency as shown in FIG. 16. More specifically, the frequency of the clock signal 18*a* is half that of the clock signal $f_0$ generated by the clock signal generator 59. The real printing data signal 18 transferred to the LED head 19 is latched after completion of a line of data. Upon receipt of a printing drive signal 13, the LED head 19 is driven with an LED head drive energy E2 in accordance with the held real printing data signal 18, so that an electrostatic latent image is formed on a photo-conductive drum.

Next, when the sheet advances by 1/1200 inch in the sheet feed direction, the printing control unit 1 switches the selector 81 to read out the video signal 11 (600 DPI data)

stored in the line buffer 82. The read out data is applied to the flip-flop 96 so that the resolution in the raster direction is converted into that in the sheet transfer direction. The resultant data from the resolution conversion, that is, an output signal of the flip-flop 96, is transferred through the selector 95 to the LED head 19 in the form of the real printing data signal 18 in synchronism with the clock signal 18a. At that time, there is generated no line timing signal 12a to the host controller, and thus the above-mentioned operation is carried out only in the printing control unit 1. Then, the printing control unit 1 transmits a latch signal 17 to the LED head 19, so that the real printing data signal 18, which has been subjected to resolution conversion, is latched or held in the LED head 19. Upon receipt of the printing drive signal 13, the LED head 19 is driven with an LED head drive energy E1 in accordance with the held real printing data signal 18, so that an electrostatic latent image is formed on the photoconductive drum.

The LED head drive energies E1 and E2 are predetermined, as shown in FIGS. 12 and 13, so as to obtain an equivalence of the dot images formed when printing with the pseudo 600 DIP resolution and the dot images formed when printing with the basic 300 DIP resolution.

According to the instant embodiment, similar to the first embodiment, the conversion is performed in such a manner that data is increased at a place apart that is spaced by a distance of 1/1200 inch from a basic raster line. The LED head drive energies E1 and E2 are predetermined so as to satisfy the relation, E1>E2, and while they can be varied depending on the developing unit 27, lenses, the characteristics of the toner, etc., they are represented by $$E1 = (0.4 \text{ to } 0.6) \times E$$

$$E2 = (0.15 \text{ to } 0.25) \times E,$$

where E denotes the LED head drive energy at the standard printing density of 300 DPI.

Figure 20:
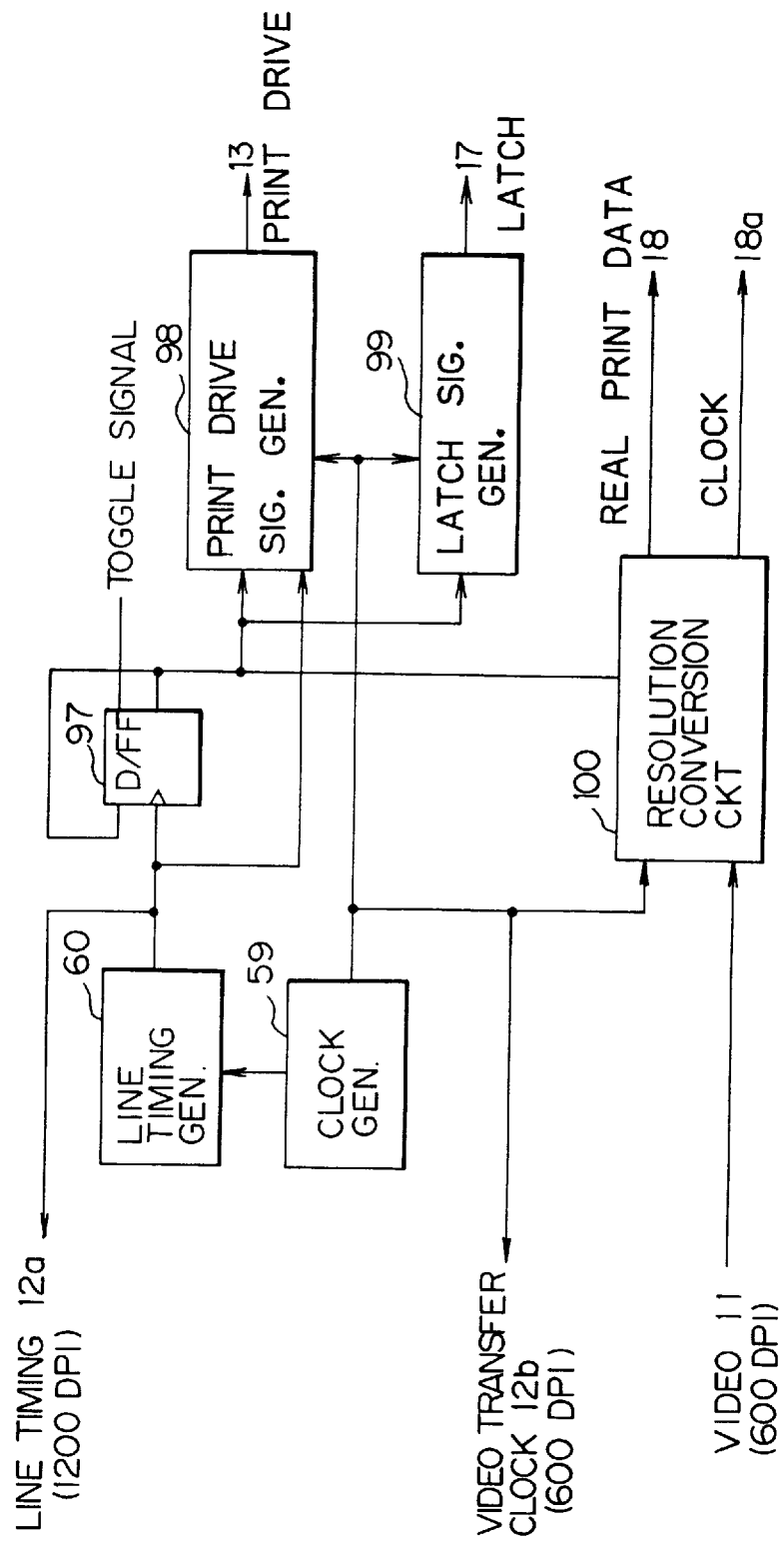
FIG. 20 is a schematic block diagram showing a print data receiving circuit of a non-impact printer according to a third embodiment of the present invention.

FIG. 20 is a block diagram schematically showing another alternative embodiment the print data receiving circuit R shown in FIG. 1. The print data receiving circuit R shown in FIG. 20 comprises a clock signal generator 59, a line timing signal generator 60, a resolution conversion circuit 100, flip-flop 97, a print drive signal generator circuit 98 and a latch signal generator circuit 99.

Figure 21:
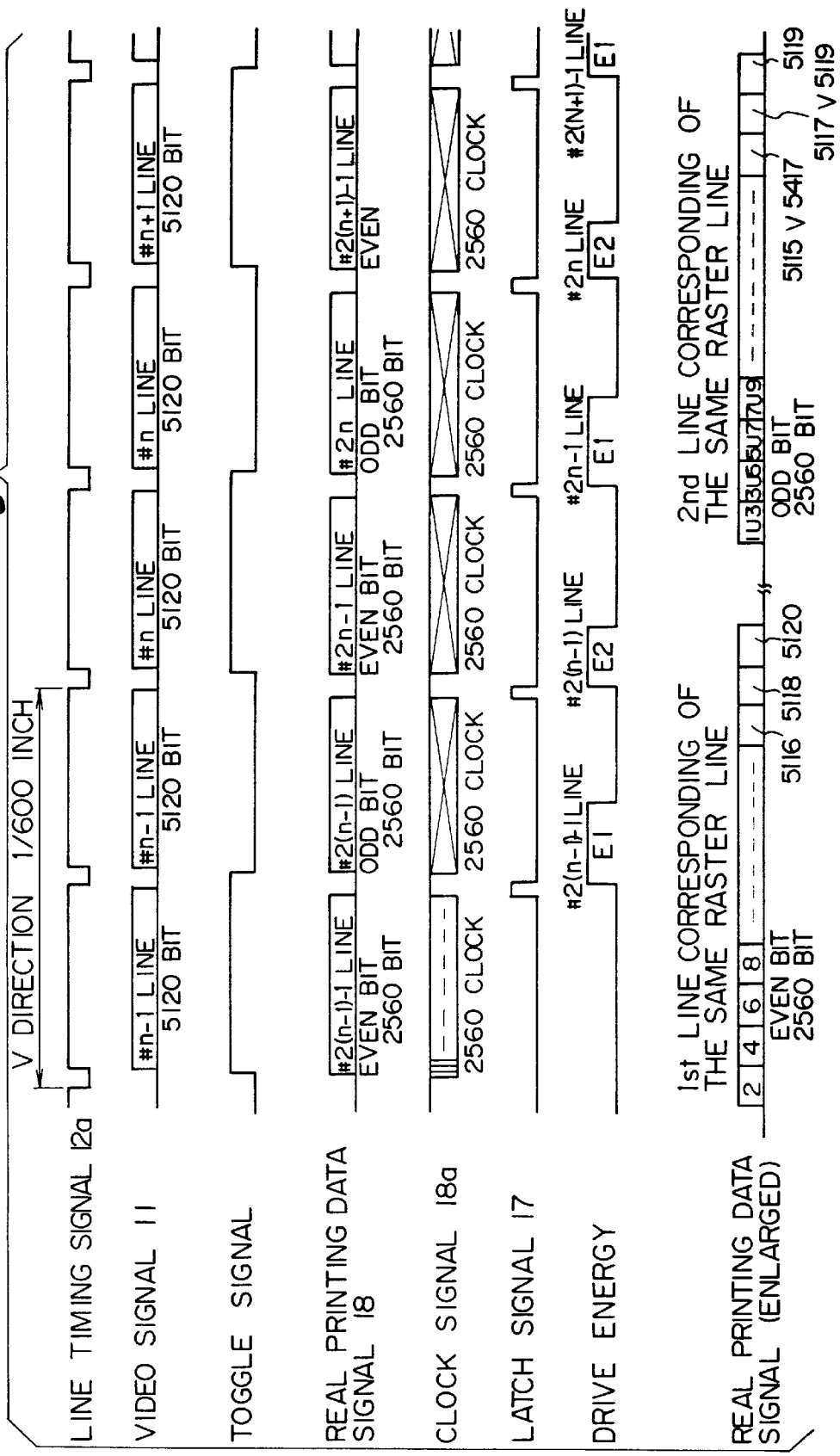
FIG. 21 is a time chart useful for understanding how the non-impact printer according to the third embodiment of the present invention works.

Referring to FIGS. 20 and 21, the printing control unit 1, which includes the print data receiving circuit R mentioned above, transmits a timing signal 12, including a line timing signal 12a and a raster timing signal, to the other controller. Upon receipt of the timing signal 12, the other controller transmits to the printing control unit 1 original image data provided with 600 DPI (row and column), which have been edited in units of pages and are stored in its memory, in the form of a video signal 11 provided with column 1,200 DPI and row 600 DPI repeated two line corresponding on the same raster line. The received video signal 11, which has been edited in units of pages in the other controller and is provided with row 600 DPI and column 1,200 DPI, is supplied to the print data receiving circuit R.

Figure 4:
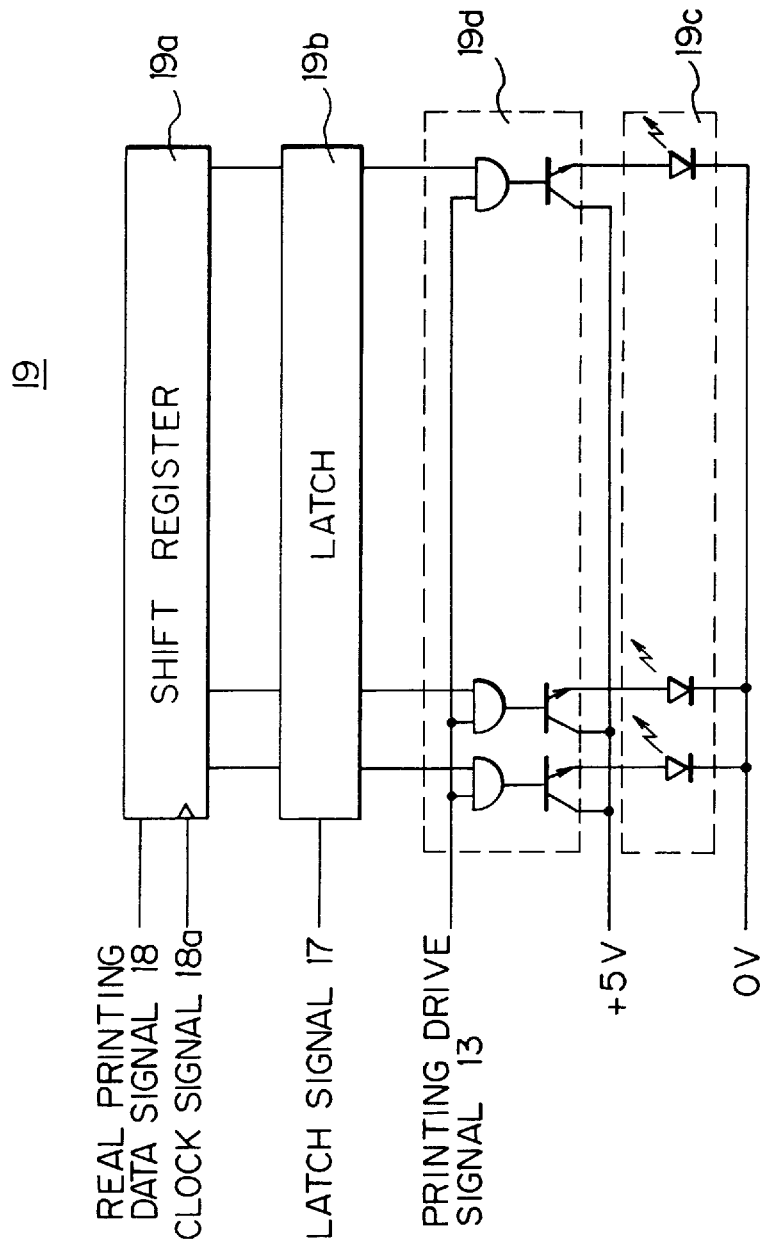
FIG. 4 is a schematic block diagram showing an LED head in the conventional non-impact printer.
Figure 6A:
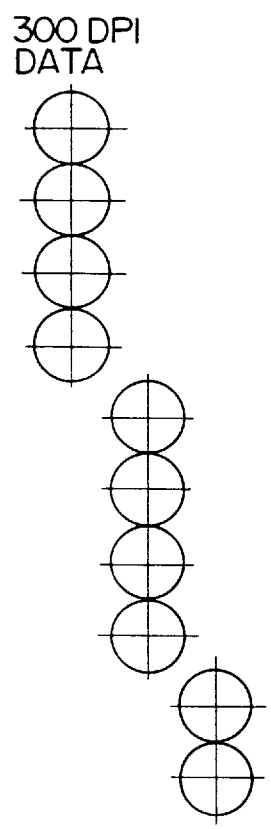
Figure 6B:
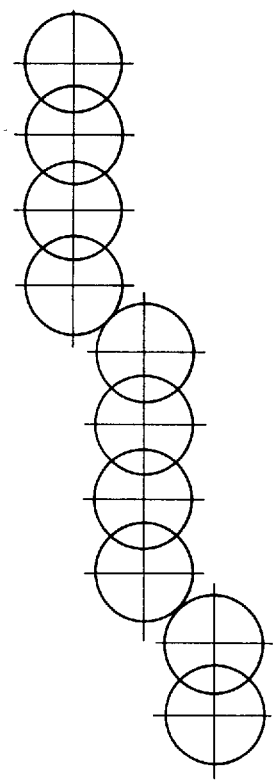
Figure 6C:
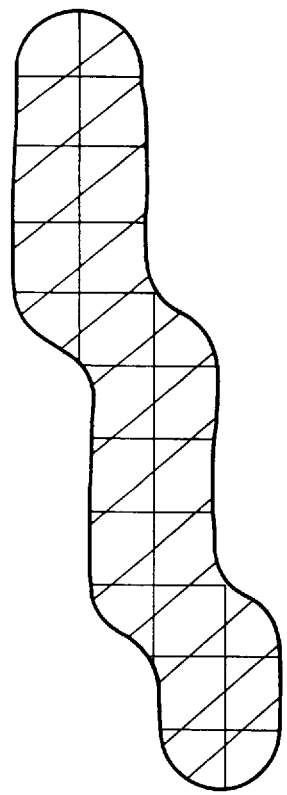

Such a video signal 11 has a resolution that exceeds the resolution of LED head 19, as in previous embodiments. A set of bit data provided by the video signal 11 is converted by the resolution conversion circuit 100 into real printing data 18 with 300 DPI resolution in the raster direction. More particularly, the video signal 11 on a first line corresponding to a raster line is converted into a first signal comprising only even numbered bit data, with odd numbered bit data in the raster direction being removed, and then the first signal is transmitted to the LED head 19 in the form of the real printing data signal 18 together with the clock signal 18a. Since the video signal 11 has a row resolution of 600 DPI, it will be apparent that the even numbered bit data provide a real printing data signal 18 having a resolution of 300 DPI, the same as the resolution of LED head 19. A shift register (e.g. 19a in FIG. 4) in the LED head 19 sequentially stores the real printing data signal 18 in synchronism with the clock signal 18a. The printing control unit 1 transmits a line of real printing data signal 18 and then a latch signal 17 to the LED head 19 prior to receiving the subsequent data from the host controller, so that the thinned out real printing data signal 18 is held in the LED head 19. A latch (e.g. 19b in FIG. 4) in the LED head 19 holds a line of real printing data signal 18 stored in the shift register 19a in accordance with the latch signal 17. Upon receipt of a printing drive signal 13 from the printing control unit 1, the LED head 19 is driven with an LED head drive energy E1 so as to illuminate the LED devices according to the held real printing data signal 18. Optical information from the LED head 19 is received by a photoconductor drum, parts of which are correspondingly charged with a negative potential in the form of an electrostatic latent image with dots elevated in potential.

Next, when the sheet advances by 1/1200 inch in the sheet feed direction, the printing control unit 1 again transmits the timing signal 12 to the host controller and receives the video signal 11 on a second line corresponding of the same raster line. That is, the same set of bit data is transmitted, as will be apparent from the depiction of video signal 11 in FIG. 21. The video signal 11 is converted into a second signal by the resolution conversion circuit 100 in such a manner that even numbered bit data in the raster direction are thinned out or removed, and the remained odd numbered bit data are subjected to a logical operation to take a logical AND on the respective odd numbered bit data and the associated odd numbered bit data located immediately before. The printing control unit 1 transmits a line of real printing data signal 18 and then a latch signal 17 to the LED head 19 prior to receiving the subsequent video signal 11 from the host controller, so that the thinned out real printing data signal 18 is held in the LED head 19. Upon receipt of a printing drive signal 13 from the printing control unit 1, the LED head 19 is driven with an LED head drive energy E2 in accordance with the held real printing data signal 18, so that an electrostatic latent image is formed on the photoconductive drum.

Figure 22:
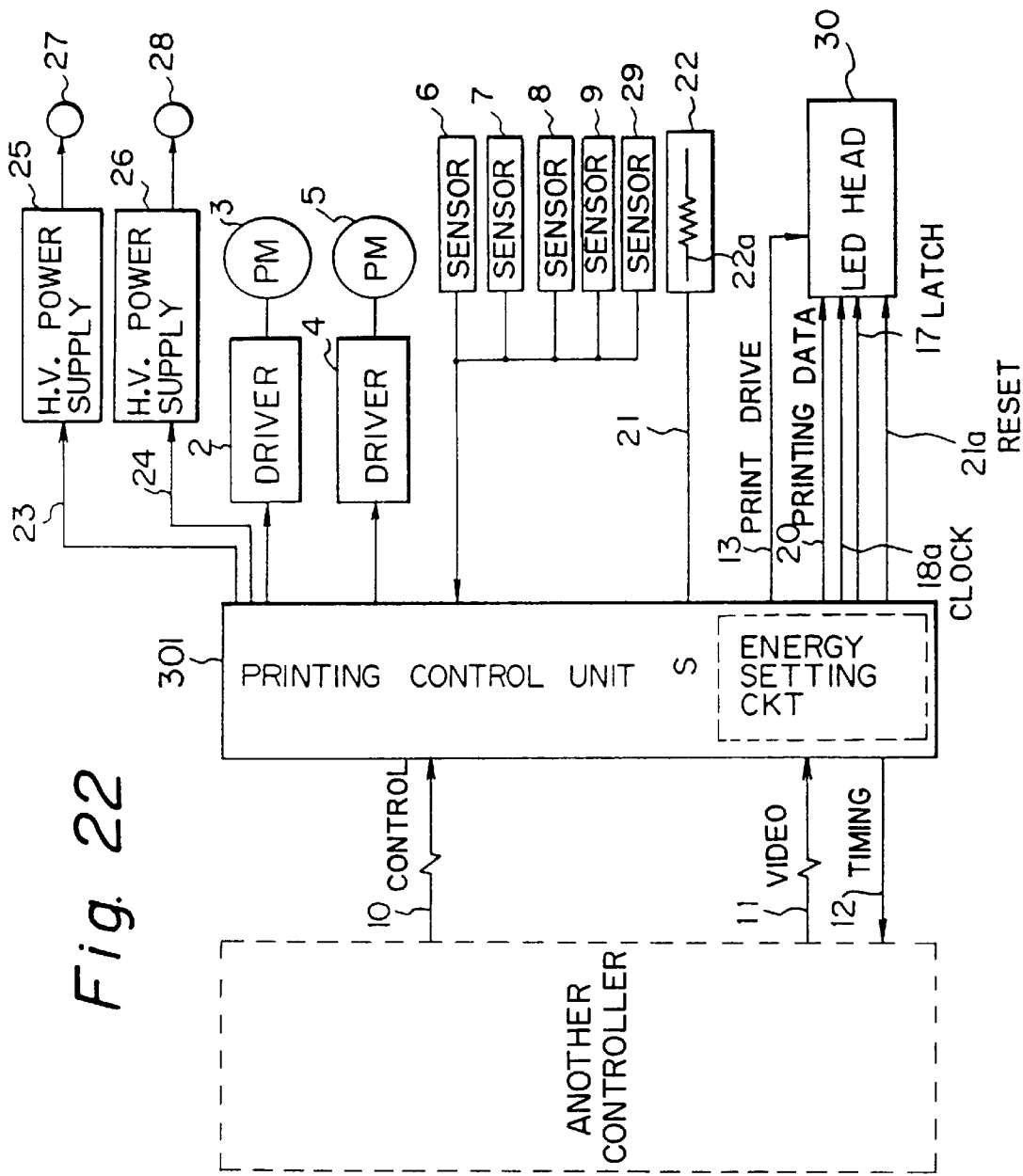
FIG. 22 is a schematic block diagram of a control circuit of a non-impact printer according to another preferred embodiment of the present invention.
Figure 24:
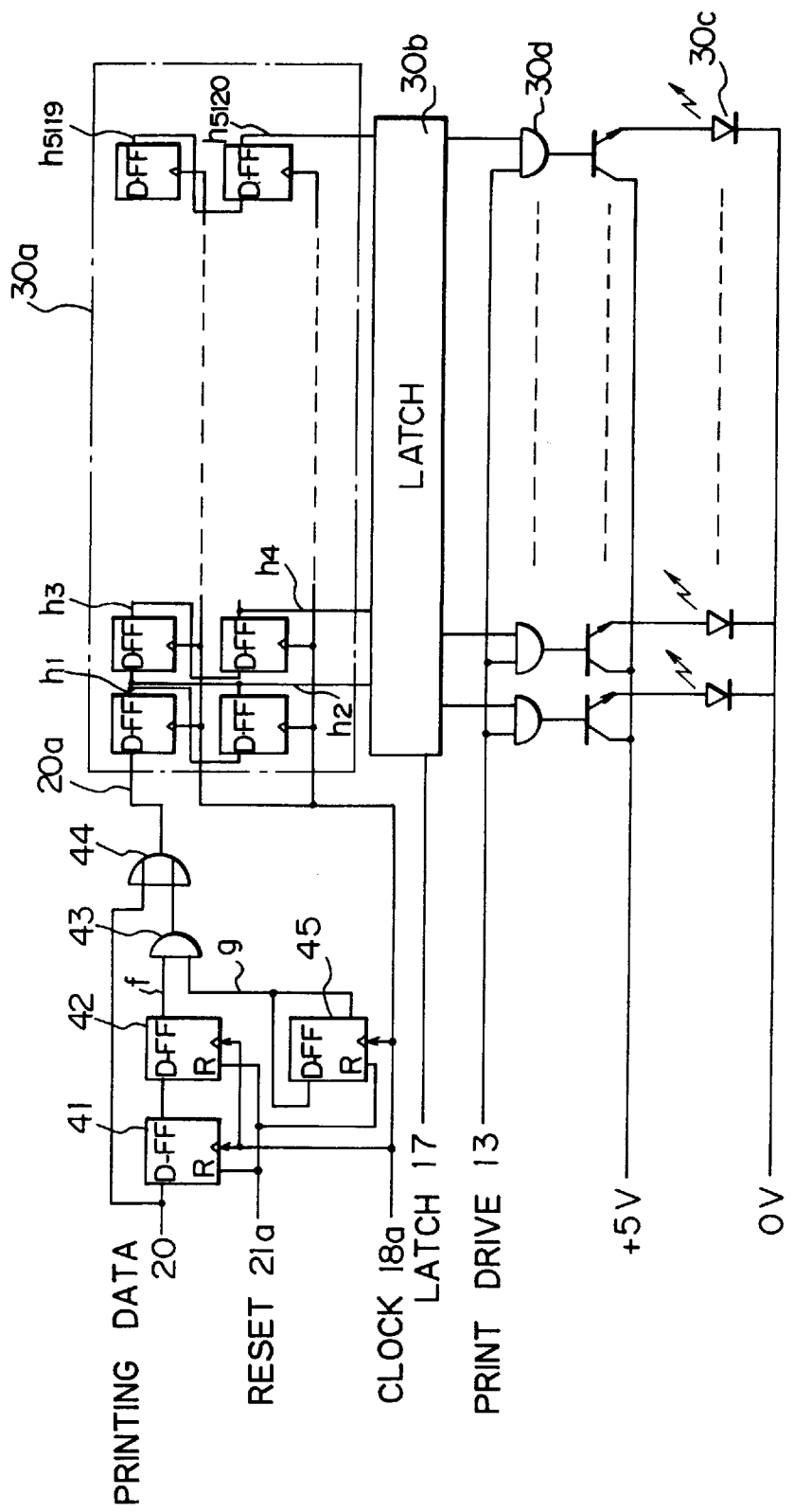
FIG. 24 is a circuit diagram by way of example partially showing an LED head in the non-impact printer according to the embodiment shown in FIG. 22.
Figure 25:
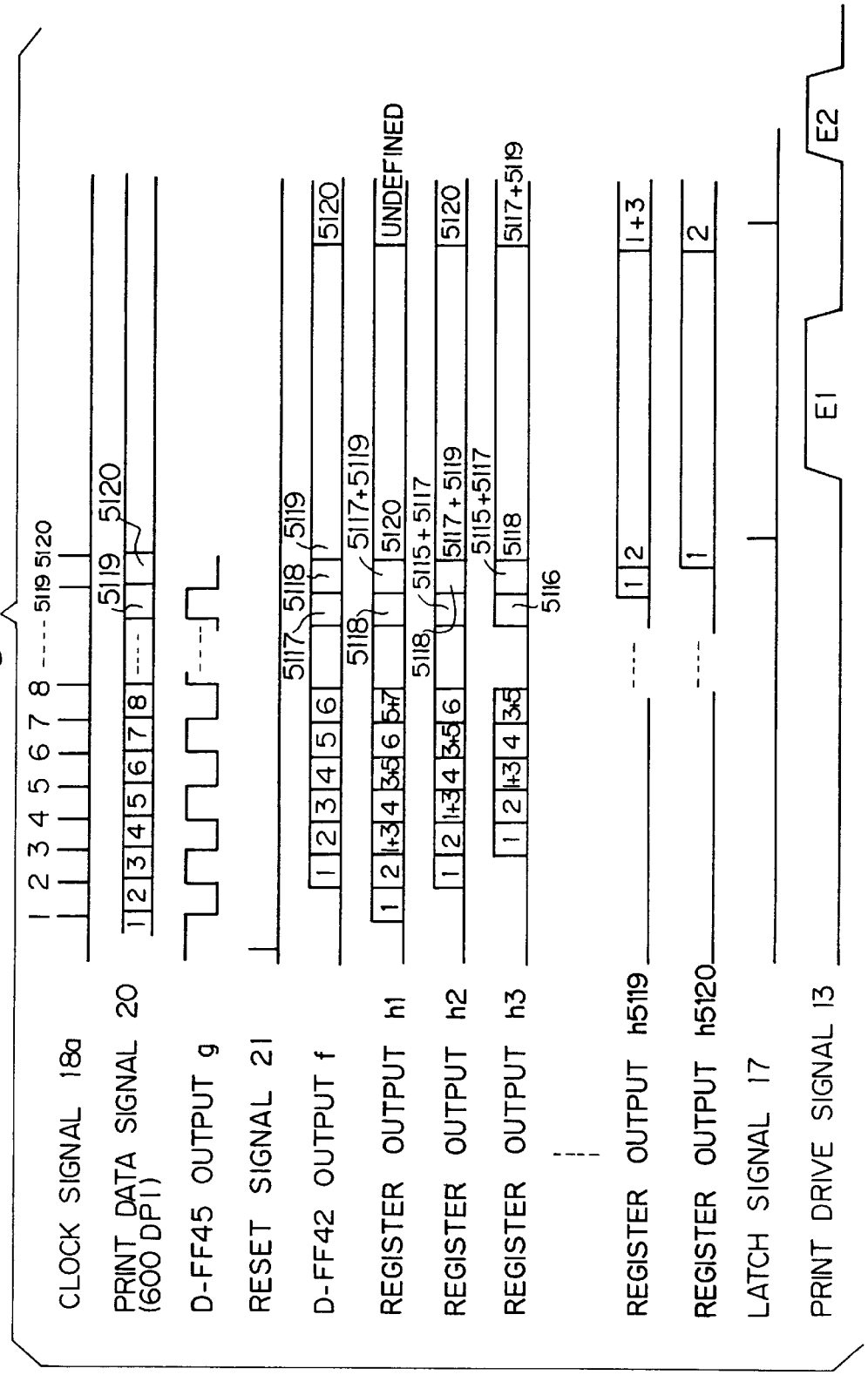
FIG. 25 is a time chart useful for understanding how the non-impact printer according to the embodiment shown in FIG. 22 operates.

Next, another embodiment of a non-impact printer according to the present invention will be described referring to FIGS. 22–25. FIG. 22 shows a control circuit of the non-impact printer according to this embodiment, FIG. 23 is a block diagram showing an LED head 30 in the non-impact printer, FIG. 24 is a partial circuit diagram examplarily showing the LED head 30 in the non-impact printer, and FIG. 25 is a time chart useful for understanding the non-impact printer according to the embodiment.

In FIG. 22, reference numbers that are the same as those in FIG. 1 denote like elements. A control circuit of the non-impact printer in FIG. 22 includes an LED head 30 adapted to receive a printing data signal 20 of 600 DPI from a printing control unit 301. More specifically, at this stage, the printing data signal 20 is provided with the same resolution as the video signal 11. The printing control unit 301 is adapted to generate a reset signal 21a to reset flip-flops contained in the LED head 30.

Figure 23:
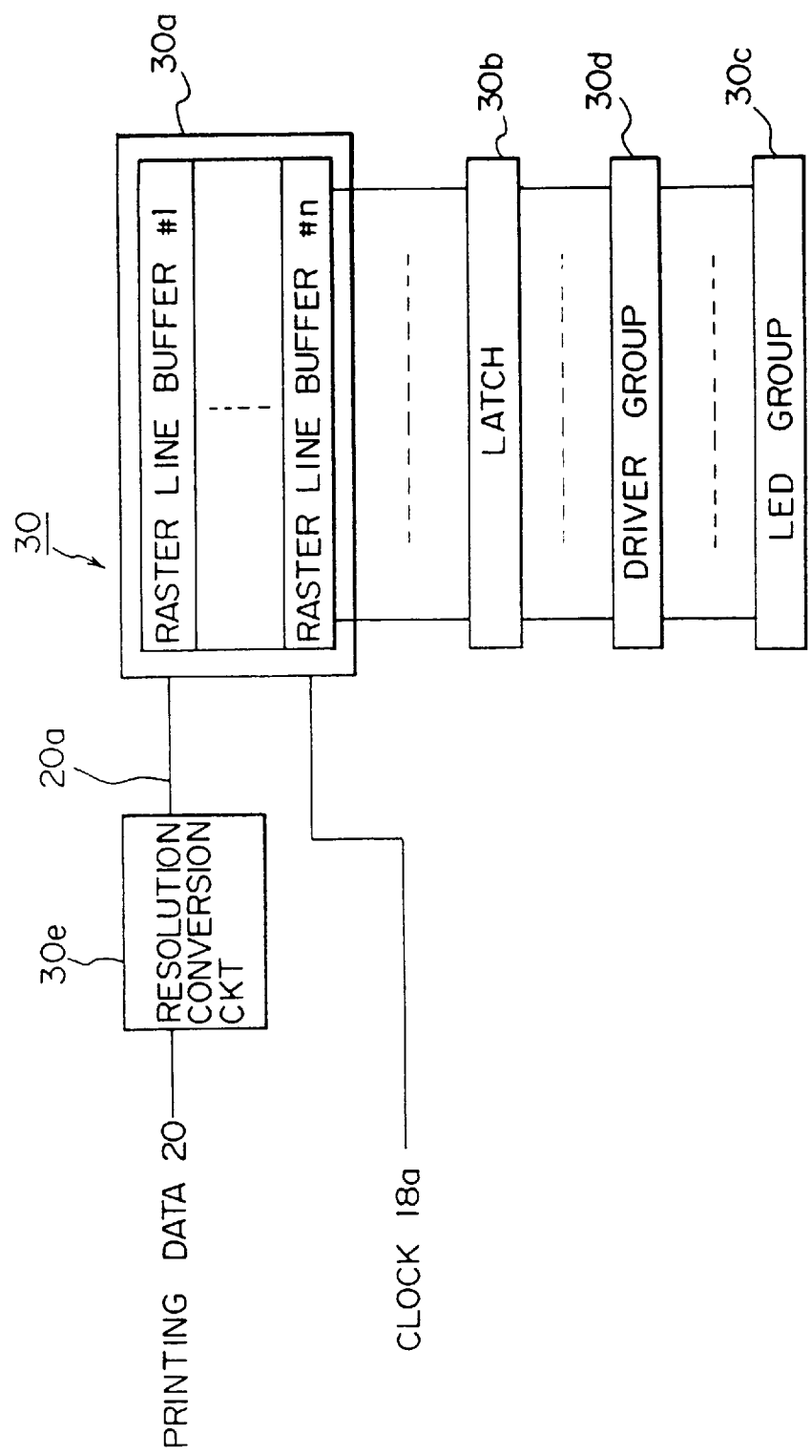
FIG. 23 is a schematic block diagram showing an LED head in the non-impact printer according to the embodiment shown in FIG. 22.

The LED head 30 shown in FIG. 23 comprises a shift register 30a consisting of raster line buffers 1 through n, a latch 30b, an LED group 30c including LED devices corresponding to the raster lines of dots, a driver group 30*d* consisting of drivers for the LED devices of the LED group 30*c*, and a resolution conversion circuit 30*e* for converting the resolution of the printing data signal 20.

Now, the present embodiment of the non-impact printer of the invention will be described taking by way of example a case in which printing is performed with a resolution (an arrangement pitch in a raster direction of LED devices) of 300 DPI in a transverse direction of the LED head 30 in a printing unit of the non-impact printer, the resolution of the received video signal 11 is 600 DPI, and the resolution of the real printing image is 300 DPI in the raster direction and 1200 DPI in the printing direction. It is noted that the relation of the video signal 11 before and after conversion of the resolution and a real printing data signal 20*a* is the same as in the first embodiment. Thus, the present embodiment will be explained also referring to FIGS. 10–13 on a common basis.

Referring to FIG. 10 again, even numbered bit data in the raster direction of the received 600 DPI image data correspond to locations (300 DPI) of the LED devices of the LED head 30. They are printed on a raster line provided with 600 DPI in a sheet transfer as they are. On the other hand, odd numbered bit data in the raster direction of the received image data do not correspond to locations of the LED devices of the LED head 30. Thus, they are not able to be printed on the same raster line. Instead, each of the odd numbered bit data is divided into portions located right and left at a distance of $\frac{1}{300}$ inch from each other, and is printed on an additional raster line located at a short distance, for instance $\frac{1}{1200}$ inch, from the basic raster line in the sheet transfer direction.

A drive energy E1 on the basic raster line and a drive energy E2 on the additional raster line is predetermined, as shown in FIGS. 12 and 13, so as to obtain an equivalence of a real printing image formed with the pseudo 600 resolution DPI and a real printing image formed with the basic 300 DIP resolution.

Accordingly, the drive energies E1 and E2 are predetermined so as to satisfy the relation, E1>E2, and they are represented by E1=(0.4 to 0.6)×E E2=(0.15 to 0.25)×E, where E denotes the drive energy at the standard density, 300 DPI.

Again referring to FIG. 22, upon receipt of a control signal 10 for a print instruction from a host controller, the printing control unit 301 serves to feed a print sheet to a print ready position. The printing control unit 301 transmits, when the sheet arrives at the printing ready position, a timing signal 12, to the other controller, not shown, and receives a video signal 11. The received video signal 11, which has been edited in units of pages in the other controller or host controller and which has 600 DPI resolution is transmitted together with a clock signal 18*a* through the printing control unit 301 to the LED head 30 in the form of a printing data signal 20.

Next, operation of the LED head 30 will be described referring to FIGS. 23, 24 and 25. FIG. 24 shows partially, more specifically, the LED head 30 shown in FIG. 23. printing data signal 20 is sequentially supplied to flip-flops 41 and 42. The Real printing data 20*a* is outputted from a logical OR gate 44, and then supplied together with the clock signal 18*a* to the shift register 30*a*. The shift register 30*a* includes 5120 flip-flops which are arranged in series.

Those flip-flops constitute two line buffers. In other words, each of the line buffers comprises 2,560 flip-flops. As shown in the figure, the output signals of every other flip-flop are applied to the latch 30*b*. The clock signal 18*a* is applied to the respective flip-flops. A flip-flop 45 is adapted to produce alternately binary values of "1" and "0". The flip-flops 41, 42, and 45, a logical AND gate 43 and the OR gate 44 constitute in combination the resolution conversion circuit 30*e*.

In the resolution conversion circuit 30*e*, the OR gate 44 receives the printing data signal 20 and an output of the AND gate 43. The AND gate 43 receives an output signal f of the flip-flop 42 and an output signal g of the flip-flop 45. The output signal g of the flip-flop 45 is controlled in such a manner that when odd numbered bit data of the printing data signal 20 of 600 DPI resolution are transmitted, it is given with a binary value of "1", and when even numbered bit data are transmitted, it is given with a binary value of "0". The output signal f of the flip-flop 42 holds bit data which is delayed by two bits which is delayed by the flip-flops 41 and 42. Consequently the AND gate 43 outputs alternately the odd numbered bit data immediately before the current odd numbered bit data and the binary value "0".

Thus, the shift register 30*a* receives alternately data which is obtained by taking a logical OR of the odd numbered bit data of the 600 DPI printing data signal 20 and the odd numbered bit data immediately before the current odd numbered bit data, and the even numbered bit data. That is, the shift register 30*a* receives alternately the bit data to be printed on the basic raster lines, and the bit data to be printed on the additional raster lines.

The printing control unit 301 transmits a latch signal 17 to the LED head 30, so that the latch 30*b* stores data of 300 DPI resolution which is transferred to the raster line buffer provided in the shift register 30*a* corresponding to the even numbered bit data. Upon receipt of a printing drive signal 13 from the printing control unit 301, the LED head 30 is driven with a drive energy E1 so as to form an electrostatic latent image on the photoconductor drum.

Next, the sheet advances by $\frac{1}{1200}$ inch in the sheet feed direction, and the printing control unit 301 transmits one clock pulse of the clock signal 18*a* and then the latch signal 17 to the LED head 30 as a result, data stored in the raster line buffer associated with the odd numbered bit data in the shift register 30*a* are shifted to the raster line buffer associated with the even numbered bit data in the shift register 30*a* and then latched or held in the latch 30*b*. Upon receipt of a printing drive signal 13 from the printing control unit 301, the LED head 30 is driven with a drive energy E2 so as to form an electrostatic latent image on the photoconductor drum.

Next, a further embodiment of a non-impact printer according to the present invention will be explained referring to the drawings, including FIG. 22, FIG. 26, which is a partial circuit diagram by way of example showing a modified LED head 30 for use in the arrangement shown in FIG. 22, and FIG. 27, which is a time chart useful for explanation of the non-impact printer according to the further embodiment.

This embodiment is intended to obtain the real printing data for printing on the additional raster lines by means of a logical operation. Referring to FIG. 26, the LED head 30 comprises a shift register 30*a*, a latch 30*b*, an LED group 30*c* including LED devices corresponding to the raster lines of dots, a driver group 30*d* of drivers for driving the LED devices of the LED group 30*c*, and a buffer 30*f* for storing therein the printing data signal 20 on the preceding line corresponding to 5,120 dots.

Each of the shift register 30a and the buffer 30f includes 5,120 flip-flops which are arranged in series. The shift register 30a comprises a first group 32a of flip-flops and a second group 32 of flip-flops, each group having 2,560 flip-flops. As shown in the figure, the output signals of every other flip-flop are applied to the latch 30b.

Figure 26:
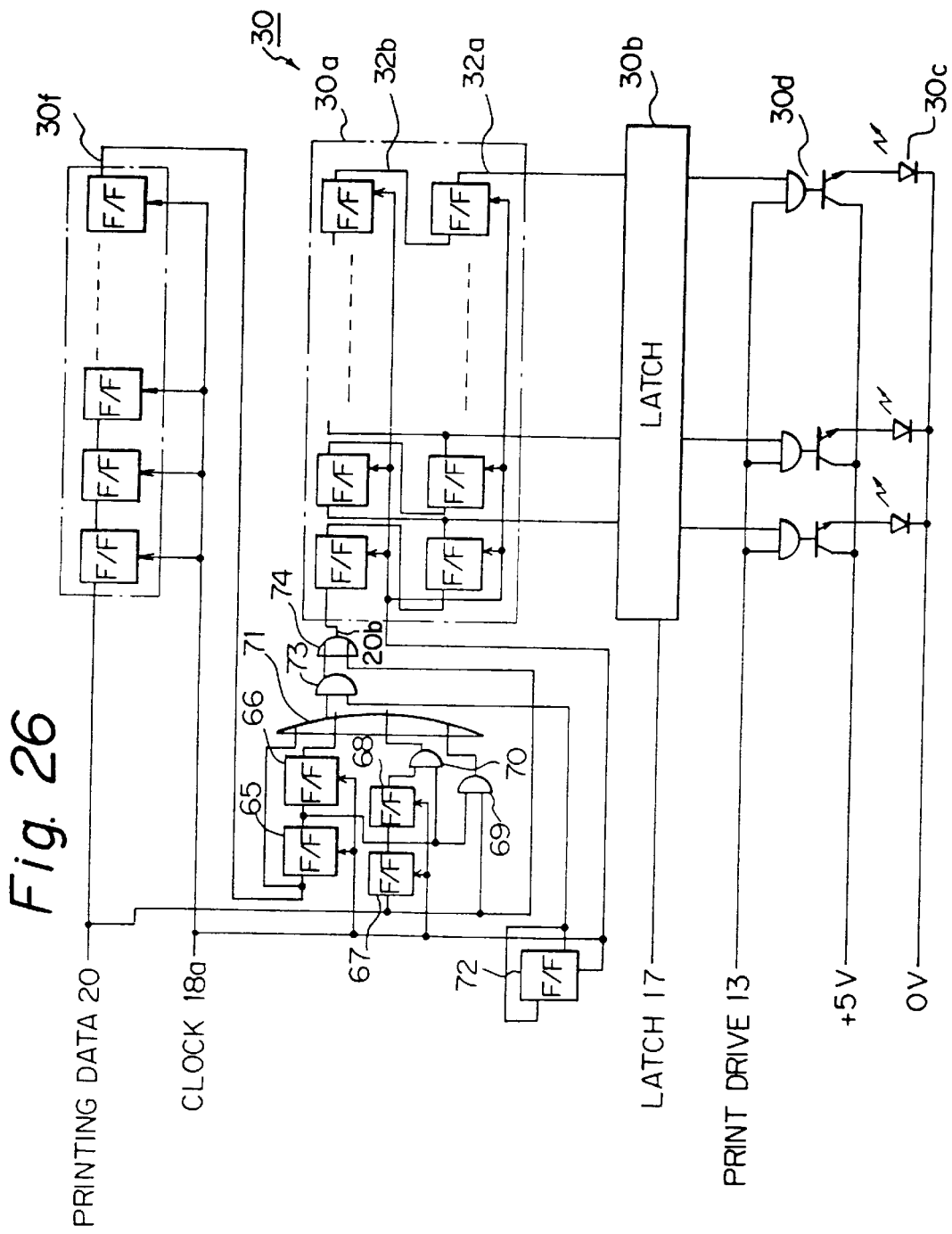
FIG. 26 is a further partial circuit diagram by way of example showing an LED head in the non-impact printer according to the embodiment shown in FIG. 22.

The LED head 30 shown in FIG. 26 further includes a logical operation circuit for performing a logical operation on the printing data signal 20 on the preceding line stored in the buffer 30f and the printing data signal 20 now transmitted. The logical operation circuit comprises flip-flops 65 and 66 for latching two dots of bit data in the printing data signal 20 on the preceding line transferred from the buffer 30f, flip-flops 66 and 68 for latching two dots of bit data in the printing data signal 20 on the current line or the now noted line, an AND gate 69 for taking a logical AND of the output of the flip-flop 65 and the printing data signal 20, a further AND gate 70 for taking a logical AND of the respective outputs of the flip-flops 65 and 68, an OR gate 71 for taking a logical OR of the printing data signal 20, the output signal of the flip-flop 66, an output signal of the AND gate 69 and the output signal of the AND gate 70, a flip-flop 72 adapted to produce alternately binary values of "1" and "0", an AND gate 73 for imparting a logical AND on the output signal of the OR gate 71 and the output signal of the flip-flop 72, and an OR gate 74 for imparting a logical OR on an output signal of the AND gate 73 and the printing data signal 20.

In the LED head 30 mentioned above, a real printing data signal 20b and the clock signal 18a are supplied to the shift register 30a. In such an LED head, the printing data signal 20 on the preceding line stored in the buffer 30f and the printing data signal 20 that is now transmitted are logically combined by the above-mentioned logical operation circuitry in accordance with the logical expression (1) set forth above, so that real printing data for printing on the additional raster lines can be obtained.

More specifically, as a result of the above-mentioned logical operation, the odd numbered bit data are provided, and the flip-flop 72 serves to transmit to the shift register 30a alternately the odd numbered bit data and the even numbered bit data. As a result, the odd numbered bit data are set to the first stage of flip-flop group 32a and then latched in the latch 30b in accordance with the latch signal 17.

Figure 27:
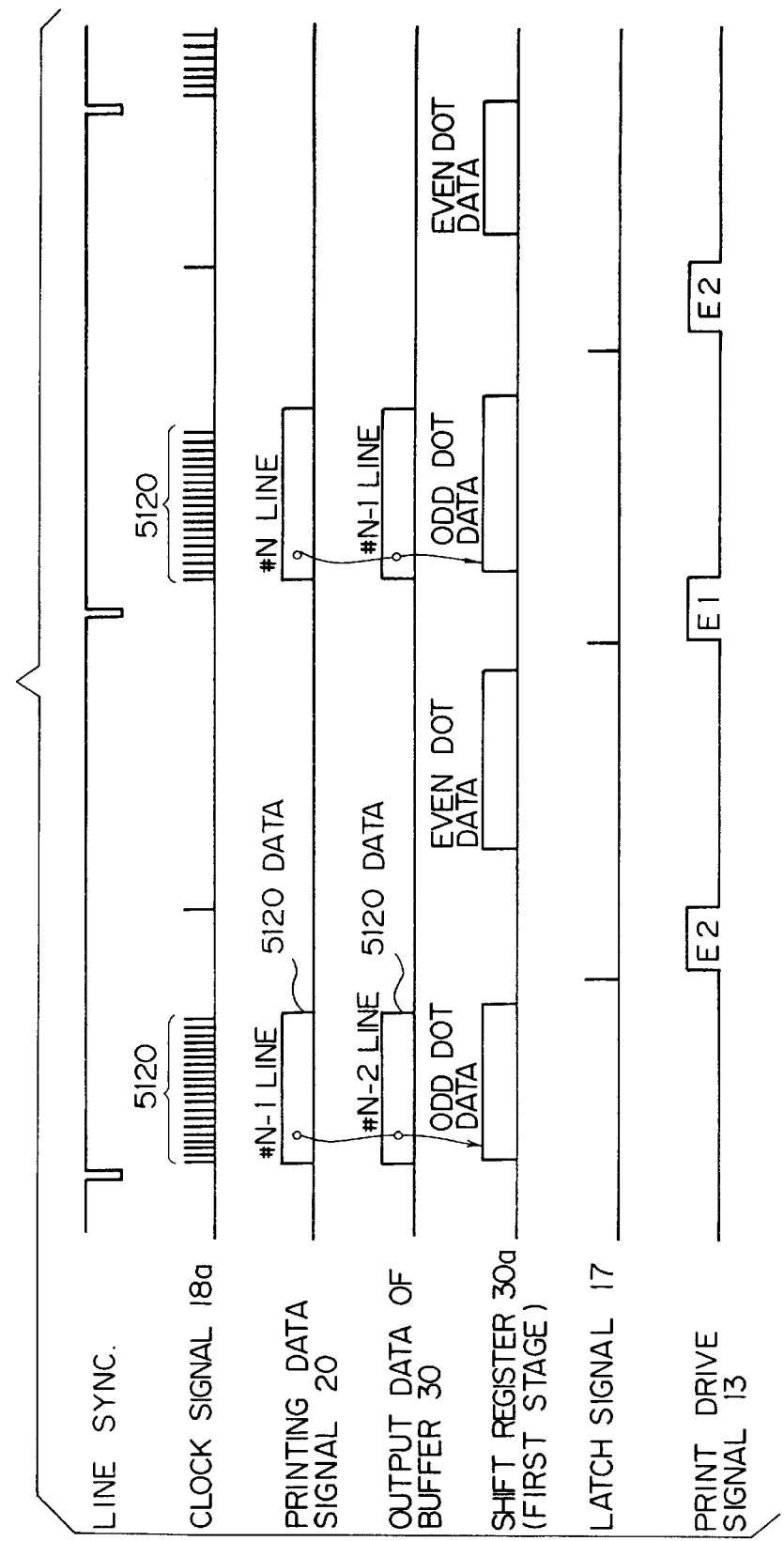
FIG. 27 is a further time chart useful for understanding how the non-impact printer according to the embodiment shown in FIG. 22 operates.

As shown in FIG. 27, after latching of the odd numbered bit data, the LED devices are supplied with a drive energy E2. Further, the printing control unit 301 transmits one clock pulse of the clock signal 18a and then the latch signal 17 to the LED head 30, so that the even numbered bit data (for printing on the basic raster lines) are set to the first stage of flip-flop group 32a and then latched in the latch 30b in accordance with the latch signal 17. Subsequently, when the sheet advances by 1/1200 inch in the sheet feed direction, the LED devices are provided with the drive energy E1. This operation is repeatedly carried out on the respective lines so as to form an electrostatic latent image on the photoconductor drum.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What we claim is:

1. A non-impact printer, comprising:
   an LED head for printing, the LED head having a predetermined resolution; and
   control means for providing sequence control for the printer in response to a control signal and a video signal from a controller, the control means emitting a printing data signal,
   wherein said LED head includes
      a shift register comprising a first line buffer and at least one additional line buffer, a data sequence corresponding to the resolution of the LED head being stored in said first line buffer, said data sequence being extracted from a set of bit data of the printing data signal emitted by the control means, the extraction of said data sequence from said set leaving remaining bit data,
      resolution conversion means for converting the remaining bit data not corresponding to the resolution of the LED head into at least one additional data sequence corresponding to the resolution of the LED head, and for storing said at least one additional data sequence in said at least one additional line buffer, and
      means, coupled to the shift register, for printing the data sequence corresponding to the resolution of the LED head on a basic raster line and for printing the at least one additional data sequence on at least one additional raster line, and
   wherein said control means includes means for setting a first LED head drive energy with which the basic raster line is printed and a second LED head drive energy with which the at least one additional raster line is printed.

2. A non-impact printer according to claim 1, wherein said means for printing comprises a plurality of adjacent LED devices, each of the LED devices having a light emission point, wherein the first LED head drive energy produces light having an emission intensity at the light emission point of each of the LED devices which exceeds a sensitivity of a photoconductor drum, and wherein the second LED head drive energy produces light having an emission intensity at the light emission point of each of the LED devices which is less than the sensitivity of the photoconductor drum, and light having an emission intensity synthesized from simultaneous light emissions at adjacent light emission points exceeding the sensitivity of the photoconductor drum.

3. A non-impact printer, comprising:
   an LED head for printing; and
   control means for providing sequence control for the printer in response to a control signal and a video signal from a controller, the control means emitting a data printing signal for a sequence of lines, the sequence of lines including a current line and a preceding line,
   wherein said LED head includes
      a buffer which stores the printing data signal for the preceding line emitted by the control means,
      a logical operation circuit, connected to the buffer to receive the data signal for the preceding line, for performing a logical operation on the printing data signal for the preceding line and the printing data signal for the current line emitted by the control means to generate a real printing data signal for printing on additional raster lines and another real printing signal for printing on basic raster lines,
      storage means for storing the real printing data signal and the another real printing data signal,
      an LED group, and
      means for alternately transferring the real printing data signal and the another real printing data signal from said storage means to said LED group, and
   wherein said control means includes means for setting a first LED head drive energy with which the basic raster lines are printed and a second LED head drive energy with which the additional raster lines are printed.

4. A non-impact printer according to claim 3, wherein said LED head further comprises a plurality of adjacent LED devices, each of the LED devices having a light emission point, wherein the first LED head drive energy produces light having an emission intensity at the light emission point of each of the LED devices which exceeds a sensitivity of the photoconductor drum, and wherein the second LED head drive energy produces light having an emission intensity at the light emission point of each of the LED devices which is less than the sensitivity of the photoconductor drum, and light having an emission intensity synthesized from simultaneous light emissions at adjacent light emission points exceeding the sensitivity of the photoconductor drum.

5. A non-impact printer according to claim 3, wherein said storage means comprises a shift register having a first portion for storing a raster line of dots and a second portion for storing another raster line of dots.

6. A non-impact printer according to claim 3, wherein:

the printing data signal has a 600 DPI resolution;

the logical operation circuit comprises means for performing a logical operation in accordance with the following logical expression:

$$B_{m=N,n=2j} = (A_{m=N,n=2j-1}) + (A_{m=N,n=2j+1}) + (A_{m=N,n=2j}) \cdot$$
$$(A_{m=N+1,n=2j+1}) + (A_{m=N,n=2j}) \cdot (A_{m=N+1,n=2j-1})$$

where $A_{m,n}$ represents bit data at an n-th position of an m-th line of the received 600 DPI video signal, $B_{m,n}$ represents bit data at the n-th position of an m-th additional raster line, and N and j are integers;

the LED head further comprises a row of LED devices disposed at a 300 DPI pitch, the LED devices being located at positions corresponding to even values of n.

* * * * *

UNITED STATES PATENT AND TRADEMARK OFFICE
Certificate

Patent No. 5,818,488                      Patented: October 6, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jiro Tanuma, Katsuyuki Ito, Shinichi Katakura, Nobuo Wakasugi and Kazuhiko Nagaoka.

Signed and Sealed this Sixth Day of April, 1999.

N. LE
*Supervisory Patent Examiner*
Technology Center 2800
Physics, Optics, Systems Components
And Electrical Engineering